United States Patent
Le et al.

(10) Patent No.: US 12,461,298 B2
(45) Date of Patent: *Nov. 4, 2025

(54) OPTICAL SYSTEM AND OPTICAL FILM

(71) Applicant: 3M INNOVATIVE PROPERTIES COMPANY, St. Paul, MN (US)

(72) Inventors: John D. Le, Woodbury, MN (US); Zhisheng Yun, Sammamish, WA (US); Timothy L. Wong, St. Paul, MN (US); Timothy J. Nevitt, Red Wing, MN (US); Adam D. Haag, Woodbury, MN (US); Arthur L. Kotz, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,242

(22) Filed: Feb. 2, 2024

(65) Prior Publication Data

US 2024/0201428 A1    Jun. 20, 2024

Related U.S. Application Data

(63) Continuation of application No. 17/054,247, filed as application No. PCT/IB2019/055936 on Jul. 11, 2019, now Pat. No. 11,927,783.

(Continued)

(51) Int. Cl.
*G02B 5/30* (2006.01)

(52) U.S. Cl.
CPC .................... *G02B 5/305* (2013.01)

(58) Field of Classification Search
CPC ........ G02B 5/305; G02B 5/30; G02B 5/3025; G02B 5/3033; G02B 5/3041;

(Continued)

(56) References Cited

U.S. PATENT DOCUMENTS

| 5,882,774 A | 3/1999 | Jonza et al. |
| 6,179,948 B1 | 1/2001 | Merrill et al. |

(Continued)

FOREIGN PATENT DOCUMENTS

| JP | 2013508781 A | 3/2013 |
| JP | 2016506544 A | 3/2016 |

(Continued)

OTHER PUBLICATIONS

Berreman, "Bragg Reflection of Light from Single-Domain Cholesteric Liquid-Crystal Films", Physical Review Letters, Aug. 1970, vol. 25, No. 9, pp. 577-581.

(Continued)

*Primary Examiner* — Stephone B Allen
*Assistant Examiner* — Adam W Booher
(74) *Attorney, Agent, or Firm* — Clifton F. Richardson

(57) ABSTRACT

Optical films, such as reflective polarizer films, and optical systems including the optical films are described. An optical system includes one or more optical lenses having at least one curved major surface, a partial reflector, and a reflective polarizer. For a substantially normally incident light in a predetermined wavelength range extending at least from about 450 nm to about 600 nm: the partial reflector has an average optical reflectance of at least 30%, and the reflective polarizer has an average optical reflectance Rs for a first polarization state, an average optical transmittance Tp for an orthogonal second polarization state, and an average optical reflectance Rp for the second polarization state, where $Tp \geq 80\%$, $Rp \leq 1\%$, and $50\% \leq Rs \leq 95\%$.

12 Claims, 15 Drawing Sheets

Related U.S. Application Data

(60) Provisional application No. 62/697,585, filed on Jul. 13, 2018.

(58) Field of Classification Search
CPC .... G02B 5/3083; G02B 27/28; G02B 27/283; G02B 27/017; G02B 27/0172
See application file for complete search history.

(56) References Cited

U.S. PATENT DOCUMENTS

| | | | |
|---|---|---|---|
| 6,300,991 | B1 | 10/2001 | Schadt et al. |
| 6,480,338 | B1 | 11/2002 | Ohzawa |
| 6,783,349 | B2 | 8/2004 | Neavin et al. |
| 7,242,524 | B2 | 7/2007 | Dike |
| 9,162,406 | B2 | 10/2015 | Neavin et al. |
| 9,519,090 | B2 | 12/2016 | Oya et al. |
| 9,557,568 | B1 | 1/2017 | Ouderkirk et al. |
| 11,927,783 | B2 * | 3/2024 | Le .................... G02B 5/285 |
| 2002/0180916 | A1 | 12/2002 | Schadt et al. |
| 2003/0028048 | A1 | 2/2003 | Cherkaoui et al. |
| 2004/0014504 | A1 | 1/2004 | Coates et al. |
| 2005/0072959 | A1 | 4/2005 | Moia et al. |
| 2006/0197068 | A1 | 9/2006 | Schadt et al. |
| 2007/0195412 | A1 | 8/2007 | Oya et al. |
| 2010/0254002 | A1 | 10/2010 | Merrill et al. |
| 2012/0062846 | A1 | 3/2012 | Dike |
| 2015/0124194 | A1 | 5/2015 | Oya et al. |
| 2017/0068102 | A1 | 3/2017 | Wong et al. |
| 2022/0004015 | A1 * | 1/2022 | Aastuen ............... G02B 5/3083 |

FOREIGN PATENT DOCUMENTS

| | | |
|---|---|---|
| JP | 2016090928 A | 5/2016 |
| KR | 20150024445 A | 3/2015 |
| WO | 2009123928 A1 | 10/2009 |
| WO | 2014046225 A1 | 3/2014 |
| WO | 2015035030 A1 | 3/2015 |
| WO | 2017039710 A1 | 3/2017 |
| WO | 2017213912 A2 | 12/2017 |

OTHER PUBLICATIONS

International Search Report for PCT International Application No. PCT/IB2019/055936, mailed on Nov. 26, 2019, 3 pages.

Denker, "Advanced Polarizer Film for Improved Performance of Liquid Crystal Displays" 2006, pp. 1528-1530.

* cited by examiner

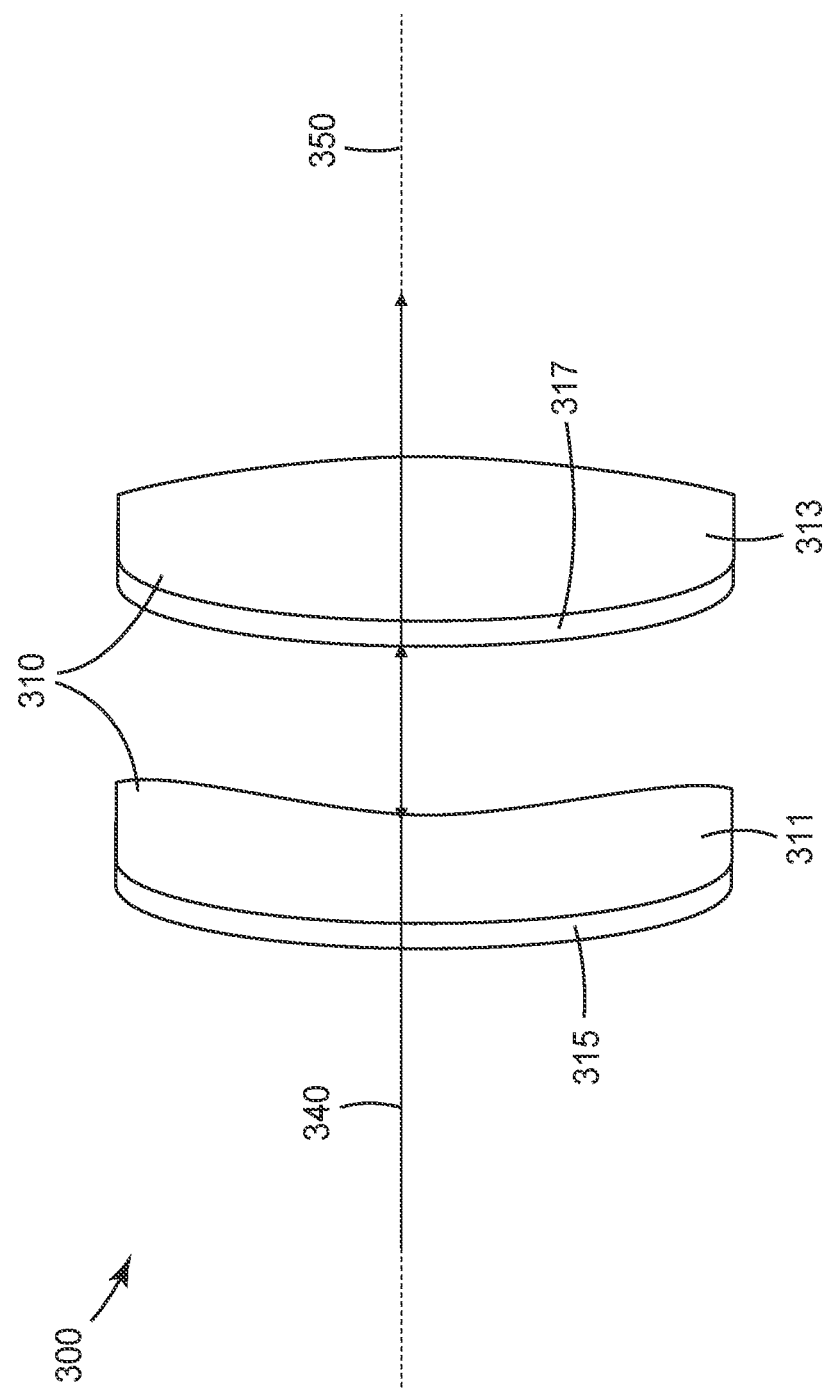

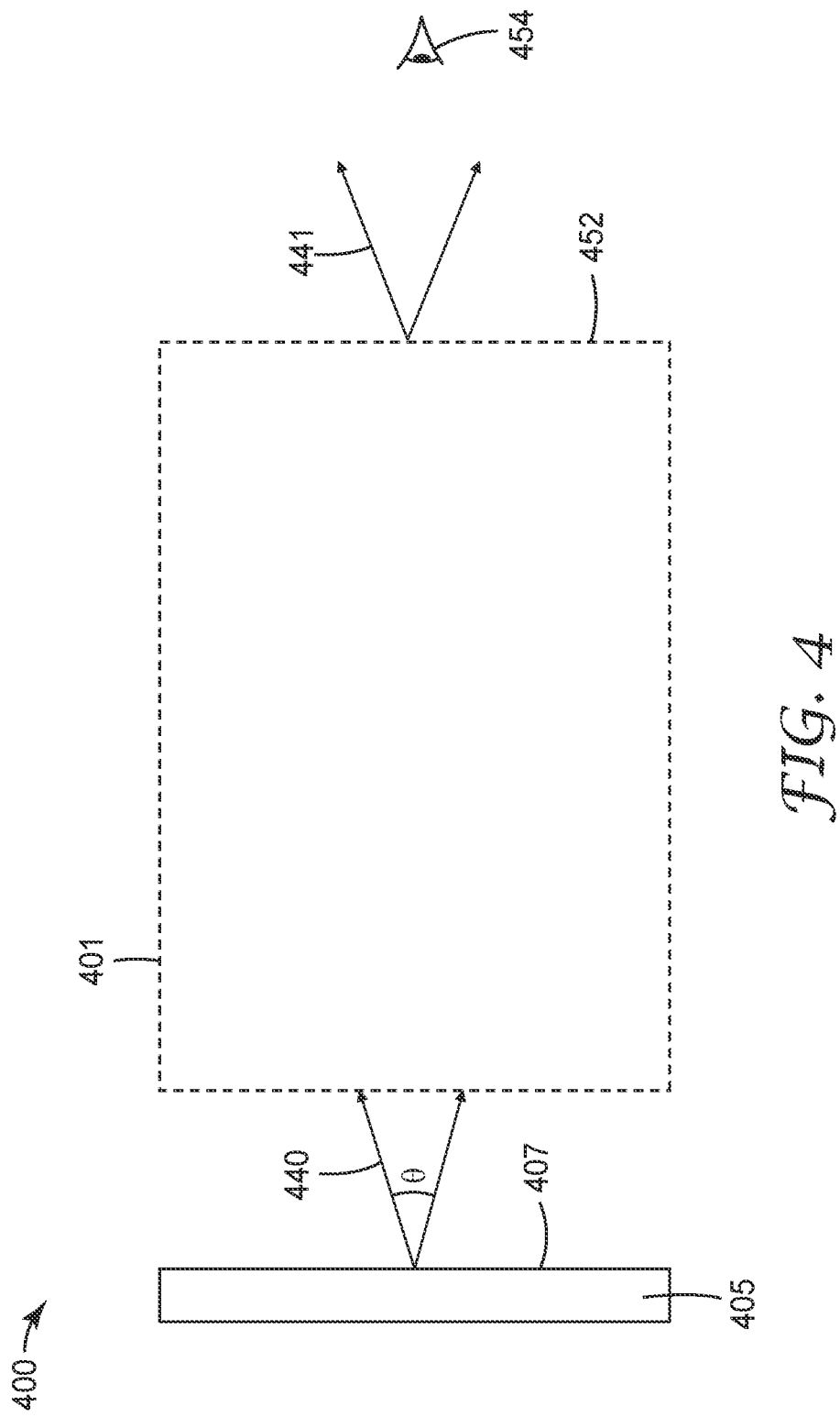

OPTICAL SYSTEM AND OPTICAL FILM

CROSS REFERENCE TO RELATED APPLICATIONS

This application is a continuation of U.S. application Ser. No. 17/054,247, filed Nov. 10, 2020, which is a national stage filing under 35 U.S.C. 371 of PCT/IB2019/055936, filed Jul. 11, 2019, which claims the benefit of U.S. Application No. 62/697,585, filed Jul. 13, 2018, the disclosures of which are incorporated by reference in their entireties herein.

BACKGROUND

Optical systems can be used in head-mounted displays, for example, to provide images to a viewer. The optical system can include an optical film such as a reflective polarizer film.

SUMMARY

In some aspects of the present description an optical system including one or more optical lenses having at least one curved major surface, a partial reflector, and a reflective polarizer is provided. For a substantially normally incident light in a predetermined wavelength range extending at least from about 450 nm to about 600 nm: the partial reflector has an average optical reflectance of at least 30%; and the reflective polarizer has an average optical reflectance Rs for a first polarization state, an average optical transmittance Tp for an orthogonal second polarization state, and an average optical reflectance Rp for the second polarization state, where Tp≥80%, Rp≤1%, and 50%≤Rs≤95%.

In some aspects of the present description an optical system including one or more optical lenses, a partial reflector disposed on and conforming to a curved major surface of the one or more optical lenses; a reflective polarizer disposed on and conforming to a major surface of the one or more optical lenses and including a plurality of polymeric layers, each polymeric layer having an average thickness of less than about 500 nm; and an exit surface is provided. For a substantially normally incident light in a predetermined wavelength range extending at least from about 450 nm to about 600 nm: the partial reflector has an average optical reflectance of at least 30%; and the plurality of polymeric layers has an average optical reflectance Rs for a first polarization state, where 50%≤Rs≤95%, and an average optical transmittance Tp≥80% for an orthogonal second polarization state. The optical system is configured to display an image to a viewer positioned proximate the exit surface. For an incident cone of light having a full cone angle of at least 10 degrees that is incident on the optical system from an object having a spatial frequency of less than about 1 line pair per millimeter and that exits the optical system through the exit surface as an exiting cone of light, when the exiting cone of light is imaged proximate the exit surface, the image has a plurality of alternating bright and dark regions. Ib is an average brightness of central 50% regions of the bright regions, Id is an average brightness of central 50% regions of the dark regions, and Ib/Id≥50.

In some aspects of the present description, an optical film including a plurality of alternating first and second polymeric layers numbering between 200 and 500 is provided. Each first and second polymeric layer has an average thickness less than about 500 nm. For each pair of adjacent first and second polymeric layers: the first layer has an index n1x along a first axis in a plane of the optical film, an index of refraction n1y along an orthogonal second axis in the plane of the optical film, and an index n1z along a z-axis orthogonal to the first and second axes; and the second layer has an index n2x along the first axis, an index of refraction n2y along the second axis, and an index n2z along the z-axis. For at least one wavelength in a predetermined wavelength range extending at least from about 450 nm to about 600 nm: a maximum difference between n1x, n1y and n1z is less than about 0.002; and a difference between n2x and n1x is greater than about 0.2. For a substantially normally incident light having the at least one wavelength in the predetermined wavelength range, the plurality of alternating first and second polymeric layers has an average optical reflectance Rs for a first polarization state along the first axis, and an average optical transmittance Tp and an average optical reflectance Rp for a second polarization state along the second axis, where Tp≥80%, Rp≤0.25%, and 80%≤Rs≤95%.

In some aspects of the present description, an optical system including one or more optical lenses; a partial reflector disposed on and conforming to a curved major surface of the one or more optical lenses; a reflective polarizer disposed on and conforming to a major surface of the one or more optical lenses; and an exit surface is provided. The reflective polarizer includes a plurality of alternating first and second polymeric layers, where each polymeric layer has an average thickness of less than about 500 nm. For a substantially normally incident light in a predetermined wavelength range extending at least from about 450 nm to about 600 nm: the partial reflector has an average optical reflectance of at least 30%; and a maximum index of refraction of the second polymeric layer is greater than a maximum index of refraction of the first polymeric layer, and a difference between the maximum index of refraction of the second polymeric layer and a minimum index of refraction of the first polymeric layer and is less than about 0.3. The optical system configured to display an image to a viewer positioned proximate the exit surface. For an incident cone of light having a full cone angle of at least 10 degrees that is incident on the optical system from an object comprising a spatial frequency of less than about 1 line pair per millimeter and that exits the optical system through the exit surface as an exiting cone of light, when the exiting cone of light is imaged proximate the exit surface, the image has a plurality of alternating bright and dark regions. Ib is an average brightness of central 50% regions of the bright regions, Id is an average brightness of central 50% regions of the dark regions, and Ib/Id≥50.

BRIEF DESCRIPTION OF THE DRAWINGS

FIG. 3 is a schematic cross-sectional view of an optical system including first and second optical lenses;

FIG. 4 is a schematic cross-sectional view of an optical system configured to display an image from a display panel to a viewer;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Folded optics systems such as those described in U.S. Pat. No. 9,557,568 (Ouderkirk et al.), for example, utilize a reflective polarizer and a partial reflector to provide a folded optical path. Such optical systems can be used in a head-mounted display, for example, to provide a high field of view, for example, to a viewer. The reflective polarizer in such optical systems have typically been chosen to provide a high reflection in a block state (e.g., a reflectance in the block state, Rs, of greater than 97%) and a high transmission in a pass state in order to provide a high efficiency. As described in U.S. Pat. No. 9,557,568 (Ouderkirk et al.) uniaxially oriented reflective polarizers, such as APF available from 3M Company (St. Paul, MN), provide advantages when used in a folded optics system. An APF film having single packet of 275 interference layers had an internal average block state reflectance Rs of about 98% and an immersed average pass state reflectance, Rp, of about 2%. According to the present description, it has been found that a reflective polarizer having a substantially lower pass state reflectance (e.g., a pass state reflectance, Rp, of no more than 1% or no more than 0.6%) provides a higher contrast than using conventional reflective polarizers even when the reflectance in the block state is sacrificed (e.g., an Rs of no more than 95%) in order to provide the low pass state reflectance. It has been found that reflection from the reflective polarizer in the pass state causes a reduction in contrast due to multiple subsequent reflections in the optical system of the reflected pass state light.

It has been found that to achieve a desired low Rp, Rs is typically reduced. For example, in some embodiments, the reflective polarizer is a multilayer optical film including alternating layers of higher and lower index polymeric layers. Decreasing the number of layers or decreasing the index difference between the higher and lower index layers in such a reflective polarizer can decrease Rp (e.g., due to decreased reflections from mismatches in refractive indices along the pass direction) but also decrease Rs. As another example, in some embodiments, the reflective polarizer is a wire grid polarizer. Decreasing the wire density can decrease Rp but also decrease Rs.

Figure 1:
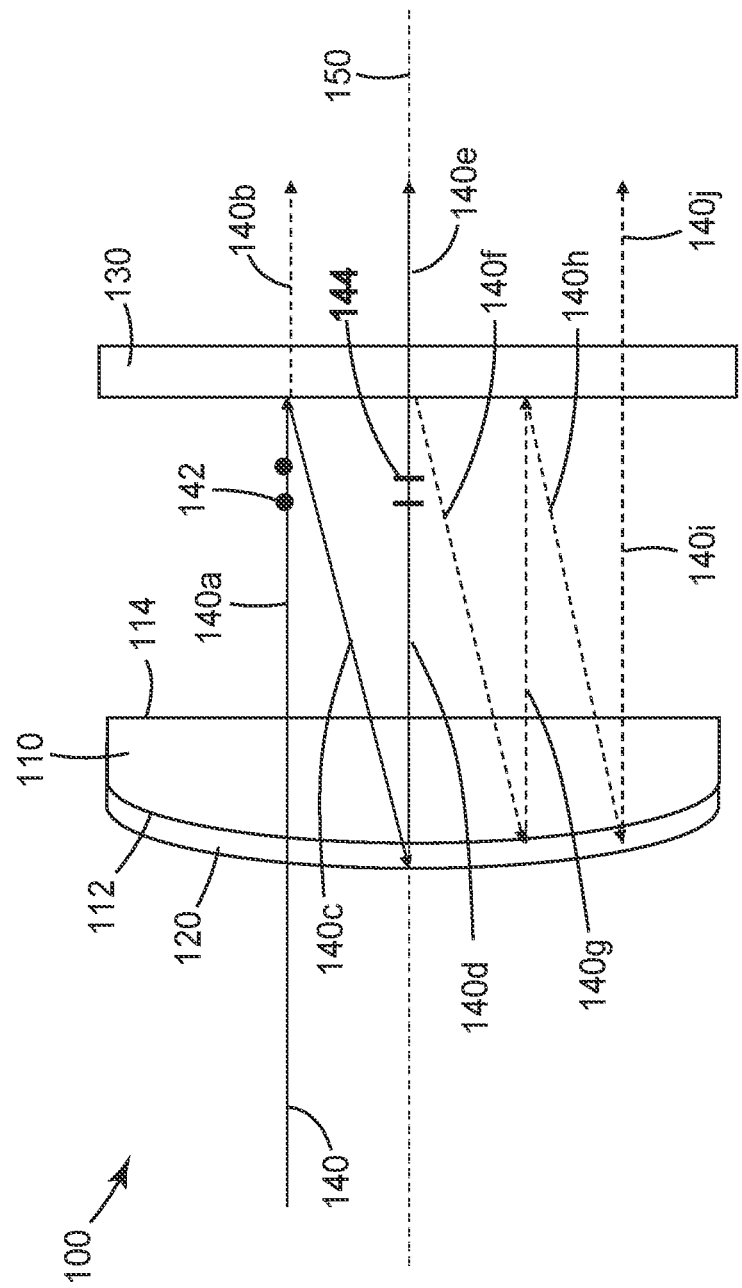
FIGS. 1-2 are schematic cross-sectional views of optical systems.

FIG. 1 is schematic cross-sectional view of an optical system 100 including one or more optical lenses 110 having at least one curved major surface 112, a partial reflector 120, and a reflective polarizer 130. The optical system 100 is configured such that for a substantially normally incident light 140 in a predetermined wavelength range extending at least from about 450 nm to about 600 nm: the partial reflector 120 has an average optical reflectance of at least 30%, and the reflective polarizer 130 has an average optical reflectance Rs for a first polarization state 142, an average optical transmittance Tp for an orthogonal second polarization state 144, and an average optical reflectance Rp for the second polarization state 144. In some embodiments, Tp≥80%, Rp≤1%, and 50%≤Rs≤95%. In some embodiments, Tp≥85% or Tp≥90%. In some embodiments, Rp≤0.8%, or Rp≤0.6%, or Rp≤0.4%, or Rp≤0.25%, or Rp≤0.2%. In some embodiments, 80%≤Rs≤95% or 85%≤Rs≤95%. In some embodiments, for the substantially normally incident light 140 in the predetermined wavelength range, the reflective polarizer has an average optical transmittance Ts of less than about 10% or less than about 5% for the first polarization state 142. Tp, Ts, Rp and Rs refer to the unweighted average of the corresponding transmittance or reflectance over the predetermined wavelength range. In some cases, the corresponding photopically averaged transmittance or reflectance $T_p^{ph}$, $T_s^{ph}$, $R_p^{ph}$ and $R_s^{ph}$, respectively, may be specified. $T_p^{ph}$, $T_s^{ph}$, $R_p^{ph}$ and $R_s^{ph}$ may be in any of the respective ranges described for Tp. Ts, Rp and Rs. The photopic weighting used to determine $T_p^{ph}$, $T_s^{ph}$, $R_p^{ph}$ and $R_s^{ph}$ may be defined by the CIE (International Commission on Illumination) 1931 2° Standard Observer and the light source used in determining $T_p^{ph}$, $T_s^{ph}$, $R_p^{ph}$ and $R_s^{ph}$ may be the CIE Illuminant C.

The predetermined wavelength range extends from at least from about 450 nm to about 600 nm. It has been found average reflectances and average transmittances over wavelength ranges extending at least from about 450 nm to about 600 nm are useful in characterizing the reflective polarizer. The predetermined wavelength range may extend to wavelengths lower than 450 nm and/or to wavelengths higher than 600 nm. In some embodiments, the predetermined wavelength range extends at least from about 400 nm to about 600 nm, or extends at least from about 450 nm to about 650 nm, or extends at least from about 450 nm to about 700 nm, or extends at least from about 400 nm to about 700 nm. In some embodiments, the predetermined wavelength range is from about 450 nm to about 600 nm, or from about 450 nm to about 650 nm, or from about 450 nm to about 700 nm, or from about 400 nm to about 700 nm.

In the illustrated embodiment, the partial reflector 120 is disposed on and conforms to the curved major surface 112 of the one or more optical lenses 110. In some embodiments, the reflective polarizer 130 is disposed on and conforms to a major surface of the one or more optical lenses 110. For example, the reflective polarizer 130 may be disposed (e.g., directly or indirectly through one or more optical layer and/or one or more adhesive layers) on a major surface 114 of the one or more optical lenses 110, which may be a substantially planar surface as illustrated or which may be a curved surface. In the illustrated embodiment, only one lens 110 is included, but it will be understood that optical system 100 can include more than one lens (e.g., two or more, or three or more optical lenses). For example, the partial reflector 120 may be disposed on a major surface a first optical lens and the reflective polarizer 130 may be disposed on a major surface of a different second optical lens (see, e.g., FIG. 3).

In some embodiments, the optical system 100 includes an optical axis 150 such that a light ray propagating along the optical axis 150 passes through the one or more optical lenses 110, the reflective polarizer 130, and the partial reflector 120 without being substantially refracted. In some embodiments, the one or more optical lens 110, the reflective polarizer 130, and the partial reflector 120 are centered on the optical axis 150. Without being substantially refracted means that the angle between a light ray incident on a surface and a light ray transmitted through the surface is no more than 15 degrees. In some embodiments, an angle between the incident ray and the transmitted ray is less than 10 degrees, or less than 5 degrees, or less than 3 degrees, or less than 2 degrees. The one or more optical lens 110, the reflective polarizer 130, and the partial reflector 120 are disposed in optical communication with one another. Optical communication as applied to two objects means that light can be transmitted from one to the other either directly or indirectly using optical methods (e.g., reflection, diffraction, refraction).

In some embodiments, the optical system 100 further includes a retarder disposed between the partial reflector 120 and the reflective polarizer 130. The retarder may be a separate layer between the lens 110 and the reflective polarizer 130, or may be disposed on the lens 110 or on another lens in the optical system, or may be disposed on the reflective polarizer 130. The retarder may have a quarter wave retardance at one or more wavelengths in the predetermined wavelength range.

The path of light 140 is schematically illustrated in FIG. 1. The actual path may be different from that illustrated (e.g., the illustrated spacing between different portions of the light path may not be to scale). A portion 140*a* of the light 140 is transmitted through partial reflector 120 and is incident on the reflective polarizer in the block state 142. A portion 140*c* (e.g., proportional to Rs) of the portion 140*a* is reflected from the reflective polarizer 130 and another portion 140*b* (e.g., proportional to Ts) is transmitted through the reflective polarizer. A portion 140*d* of the portion 140*c* is reflected from the partial reflector 120 and another portion (not illustrated) is transmitted through the partial reflector 120. The portion 140*d* is incident on the reflective polarizer 130 in the pass state 144. A retarder can be included between the partial reflector 120 and the reflective polarizer 130 so that the portion 140*d* is in the pass state 144 when it is incident on the reflective polarizer 130. A portion 140*e* (e.g., proportional to Tp) of the portion 140*d* is transmitted through the reflective polarizer 130 and another portion 140*f* (e.g., proportional to Rp) is reflected from the reflective polarizer 130. In some embodiments where light 140 is from a display panel and the optical system 100 is configured to display the image to a viewer, the desired image is in portion 140*e*. A portion 140*g* of the portion 140*f* is reflected from partial reflector 120 and another portion (not illustrated) is transmitted through the partial reflector 120. A portion 140*h* (e.g., proportional to Rs) of the portion 140*g* is reflected from reflective polarizer 130 and another portion (e.g., proportional to Ts; not illustrated) is transmitted through the reflective polarizer 130. A portion 140*i* of the portion 140*h* is reflected from partial reflector 120 and another portion (not illustrated) is transmitted through the partial reflector 120. A portion 140*j* (e.g., proportional to Tp) of the portion 140*i* is reflected from reflective polarizer 130 and another portion (not illustrated) is reflected from the reflective polarizer 130.

Undesired reflections can degrade the contrast of the optical system 100. It has found that the portion 140*j* has a large impact on the perceived contrast (e.g., as quantified by Ib/Id as described elsewhere herein) of the optical system 100 even though it is a higher order reflection. The portion 140*b* can be blocked by including a clean-up polarizer (e.g., an optically absorptive polarizer between the reflective polarizer 130 and an exit surface of the optical system 100), but the portion 140*j* has the same polarization state 144 as the portion 140*e* and so a clean-up polarizer would not eliminate portion 140*j* without also attenuating portion 140*e*. Other unwanted reflections not necessarily shown in FIG. 1 can also reduce contrast. As described further elsewhere herein (see, e.g., FIG. 6) a variety of index matching layers and/or antireflection coatings can be included to reduce unwanted reflections.

A display panel can be included to provide the light 140. Polarizing elements, such as an optically absorptive polarizer and a retarder, can be included in the display panel or disposed between the display panel and the partial reflector 120 so that light 140 is substantially in the first polarization state 142 when first incident on the reflective polarizer 130.

The partial reflector used in any of the optical systems of the present description may be any suitable partial reflector. For example, the partial reflector may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. In some embodiments, for a substantially normally incident light in a predetermined wavelength range extending at least from about 450 nm to about 600 nm, the partial reflector has an average optical reflectance of at least 30%. In some embodiments, the average optical reflectance of the partial reflector is in a range of 40% to 60%. In some embodiments, the partial reflector has an average optical reflectance and an average optical transmittance in the predetermined wavelength range that are each in a range 30% to 70%, or each in a range of 40% to 60%, or each in a range of 45% to 55%. The partial reflector may be a half mirror, for example.

The average optical reflectance of the partial reflector refers to the optical reflectance for substantially unpolarized light substantially normally incident on the partial reflector and averaged (unweighted mean) over wavelengths in the predetermined wavelength range, unless specified differently. The average optical reflectance and average optical transmittance for the reflective polarizer for a specified polarization state refers to the optical reflectance and optical transmittance, respectively, for light substantially normally incident on the reflective polarizer in the specified polarization state and averaged (unweighted mean) over wavelengths in the predetermined wavelength range, unless specified differently.

Substantially unpolarized light is light having a sufficiently small degree of polarization that the transmittance and reflectance of normally incident substantially unpolarized light differs negligibly from that of normally incident unpolarized light. The degree of polarization is the fraction of light (by intensity) that is polarized. In some embodiments, light described as substantially unpolarized has a degree of polarization of less than 10%. In some embodiments, light described as substantially unpolarized is unpolarized or nominally unpolarized. Substantially normally incident light is light sufficiently close to normally incident that the transmittance and reflectance of substantially normally incident unpolarized light differs negligibly from that of normally incident unpolarized light. Substantially normally incident light may, in some embodiments, be within 20 degrees, or within 10 degrees of normally incident, or may be normally incident or nominally normally incident.

The reflective polarizer may be any suitable reflective polarizer having the desired reflectivity properties. For example, a wire grid polarizer having a density of wires (e.g., nanowires) selected to provide Tp≥80%, Rp≤1%, and 50%≤Rs≤95% may be used. In some embodiments, the reflective polarizer includes a plurality of alternating first and second polymeric layers and the refractive indices of the first and second polymeric layers and the total number of the first and second polymeric layers are selected to provide Tp≥80%, Rp≤1%, and 50%≤Rs≤95% as described further elsewhere herein.

Figure 2:
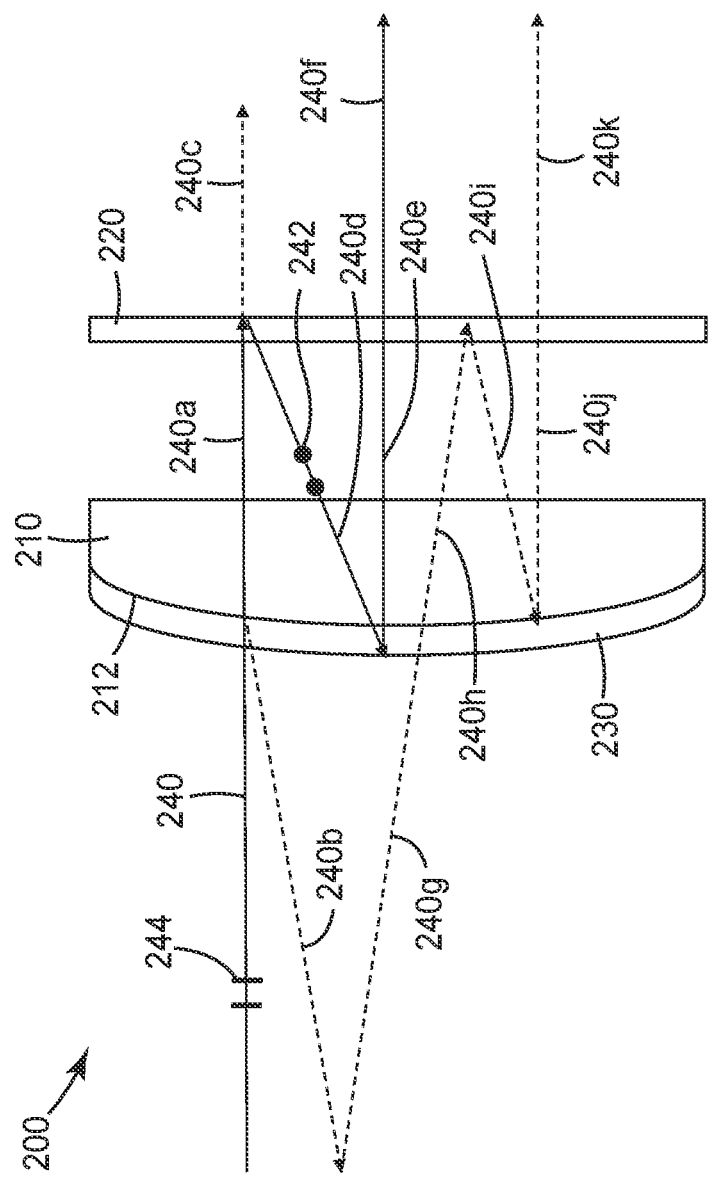

FIG. 2 is schematic cross-sectional view of an optical system 200 including one or more optical lenses 210 having at least one curved major surface 212, a partial reflector 220; and a reflective polarizer 230. The optical system 200 is in many ways similar to optical system 100 except for the relative orientations of the partial reflector and reflective polarizer. Optical system 200 is configured to receive light incident on the reflective polarizer 230 and transmit light through the partial reflector 220 to a viewer, while optical system 100 is configured to receive light incident on the partial reflector 120 and transmit light through the reflective polarizer 130 to a viewer. The reflective polarizer 230 may be as described for reflective polarizer 130 and the partial reflector 220 may be as described for partial reflector 120. The optical system 200 may further include a retarder disposed between the partial reflector 220 and the reflective polarizer 230 as described for optical system 100. In the illustrated embodiment, only one lens 210 is illustrated, but it will be understood that optical system 200 can include more than one lens (e.g., two or more, or three or more optical lenses) as describe further elsewhere herein. For example, the reflective polarizer 230 may be disposed on a major surface a first optical lens and the partial reflector 220 may be disposed on a major surface of a different second optical lens (see, e.g., FIG. 3).

The path of light 240 having a pass (second) polarization state 244 is schematically illustrated in FIG. 2. The actual path may be different from that illustrated (e.g., the illustrated spacing between different portions of the light path may not be to scale). A portion 240a (e.g., proportional to Tp) of the light 240 is transmitted through the reflective polarizer 230 and another portion 240b (e.g., proportional to Rp) is reflected from the reflective polarizer 230. A portion 240c is transmitted through the partial reflector 220 and another portion 240d is reflected from the partial reflector 220. The portion 240d is incident on the reflective polarizer 230 in the block (first) polarization state 242. A portion 240e (e.g., proportional to Rs) of the portion 240d is reflected from the reflective polarizer 230 and another portion (not illustrated) is transmitted through the reflective polarizer 230. A portion 240f of the portion 240e is transmitted through the partial reflector 220 and another portion (not illustrated) is reflected from the partial reflector 220. In some embodiments where light 240 is from a display panel and the optical system 200 is configured to display the image to a viewer, the desired image is in portion 240f. The portion 240b (and also portions of portion 240d and of portion 240i) transmitted through the reflective polarizer 230 is reflected from an object (not illustrated) in front of the optical system 200 as portion 240g. A portion 240h (e.g., proportional to Tp) of portion 240g is transmitted through reflective polarizer 230 as portion 240h and another portion (not illustrated) is reflected from reflective polarizer 230. A portion 240i of portion 240h is reflected from the partial reflector 220 and another portion (not illustrated) is transmitted through the partial reflector 220. A portion 240j (e.g., proportional to Rs) is reflected from reflective polarizer 230 and another portion (not illustrated) is transmitted through reflective polarizer 230. A portion 240k of portion 240j is transmitted through partial reflector 220 and another portion (not illustrated) is reflected from partial reflector 220.

Undesired reflections can degrade the contrast of the optical system 200. It has found that the portion 240k has a large impact on the perceived contrast of the optical system 200 even though it is a higher order reflection. The portion 240c can be blocked by including a clean-up polarizer (e.g., an optically absorptive polarizer between the partial reflector 220 and an exit surface of the optical system 200), but the portion 240k has the same polarization state as the portion 240f and so a clean-up polarizer would not eliminate portion 240k without also attenuating portion 240f. As described further elsewhere herein (see, e.g., FIG. 7) a variety of index matching layers and/or antireflection coatings can be included to reduce unwanted reflections.

A display panel can be included to provide the light 240. Polarizing elements, such as an optically absorptive polarizer, can be included in the display panel or disposed between the display panel and the reflective polarizer 230 so that light 240 is substantially in the second polarization state 244 when first incident on the reflective polarizer 230.

FIG. 3 is a schematic cross-sectional view of an optical system 300 including one or more optical lenses 310. In the illustrated embodiment, the one or more optical lenses 310 includes a first optical lens 311 and a second optical lens 313. An optical layer 315 is disposed on and conforms to a major surface of the first optical lens 311, which is a curved major surface of the first optical lens 311 in the illustrated embodiment. An optical layer 317 is disposed on and conforms to a major surface of the second optical lens 313, which is a curved major surface of the second optical lens 313 in the illustrated embodiment. Either or both of the optical layers 315 and 317 may be films or coatings disposed on the respective first and second optical lenses 311 and 313. In some embodiments, one of the optical layers 315 and 317 is a reflective polarizer (e.g., corresponding to reflective polarizer 130 or 230), which may be a multilayer optical film, and the other of the optical layers 315 and 317 is a partial reflector (e.g., corresponding to partial reflector 120 or 220). In some embodiments, the optical system 300 has an optical axis 350 such that a light ray 340 propagating along the optical axis 350 passes through the one or more optical lenses 310, and the first and second optical layers 315 and 317 without being substantially refracted. In some embodiments, the one or more optical lenses 310 are centered on the optical axis 350.

FIG. 4 is a schematic cross-sectional view of an optical system 400 which includes an optical system 401 and a display panel 405. Optical system 401 may correspond to optical system 100 or 200 or 300, for example, and optical system 400 may correspond to optical system 600 or 700 described elsewhere herein, for example. In some embodiments, optical system 401 includes one or more optical lenses; a partial reflector disposed on and conforming to a curved major surface of the one or more optical lenses; a reflective polarizer disposed on and conforming to a major surface of the one or more optical lenses and comprising a plurality of polymeric layers, each polymeric layer having an average thickness of less than about 500 nm, such that for a substantially normally incident light in a predetermined wavelength range extending at least from about 450 nm to about 600 nm: the partial reflector has an average optical reflectance of at least 30%; and the plurality of polymeric layers has an average optical reflectance Rs for a first polarization state, 50%≤Rs≤95%, and an average optical transmittance Tp≥80% for an orthogonal second polarization state. In some embodiments, Tp≥80%, Rp≤1%, and 50%≤Rs≤95%. In some embodiments, Tp≥85% or Tp≥90%. In some embodiments, Rp≤0.8%, or Rp≤0.6%, or Rp≤0.4%, or Rp≤0.25%, or Rp≤0.2%. In some embodiments, 80%≤Rs≤95% or 85%≤Rs≤95%. In some embodiments, for a substantially normally incident light in the predetermined wavelength range, the plurality of polymeric layers has an average optical transmittance Ts of less than about 10% or less than about 5% for the first polarization state. The symbols Rs, Rp, Ts, and Tp may be used to refer to the reflectance for the first and second polarization states and the transmittance for the first and second polarization states, respectively, for the reflective polarizer or for the plurality of polymeric layers which may be a plurality of interference layers reflecting and transmitting light primarily by optical interference. The values for the reflective polarizer may differ slightly from the corresponding values for the plurality of polymeric layers dues to additional interfaces in the reflective polarizer. In some embodiments, the reflective polarizer and the plurality of polymeric layers have Rs, Rp. Ts, and/or Tp in any of the above ranges.

Optical system 401 includes an exit surface 452 which is a surface through which light incident on the optical system 401 (e.g., from display panel 405) exits the optical system 401. In some embodiments, exit surface 405 is the major surface of the component of the optical system 401 farthest from the display panel 405. In some embodiments, exit surface 405 is not a surface of a component, but is a surface adapted to overlap an entrance pupil of a second optical system (e.g., a camera or a viewer's eye). The optical systems 400 and 401 are configured to display an image to a viewer 454 positioned proximate the exit surface 452.

A measure of the contrast of an optical system can be obtained by displaying an object having light and dark regions through the optical system, forming an image of the object, and determining a ratio of average brightness of bright regions to average brightness of dark regions in the image. In some embodiments, it is desired to define the contrast for an object having a low spatial frequency (e.g., less than about 1 line pair per millimeter). In some case, some portions of the bright and dark regions near transition regions between bright and dark regions are excluded when forming the ratio characterizing the contrast since such transition regions can have a high effective spatial frequency and it may be desired to define the contrast ratio in the limit of low special frequency. The object may include alternating light and dark lines or light and dark squares or rectangles, for example. The object can be characterized in terms of line pairs (pairs of light and dark lines or regions) per millimeter. The average brightness can be determined by using a camera to measure the intensity and then averaging the intensity over a specified area of bright regions (e.g., central regions of the bright regions where each central region has an area of about 50% of the area of the corresponding bright region) and over a specified area of dark regions (e.g., central regions of the dark regions where each central region has an area of about 50% of the area of the corresponding dark region). The average brightness refers to the unweighted mean intensity unless indicated differently. A spatial frequency of less than 1 line pair per millimeter may be used in determining a measure of the contrast of the optical system, while other spatial frequencies may be utilized when the optical system is used in display applications, for example. For example, on use, the optical system may display an image of an object having a spatial frequency substantially greater than 1 line pair per millimeter (e.g., a high definition image).

Figure 5B:
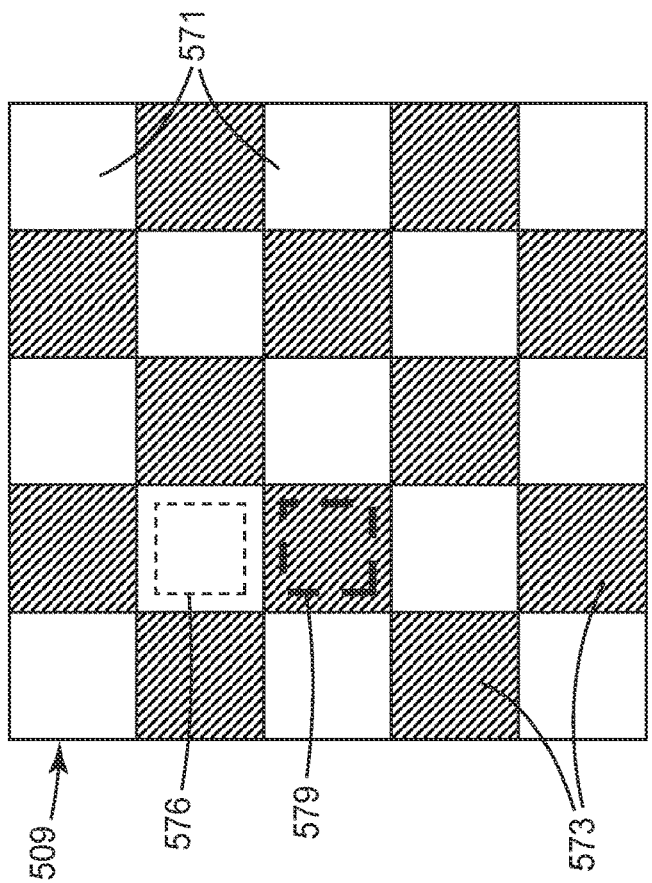
FIG. 5B is a schematic illustration of an image formed from the object of FIG. 5A.
Figure 5A:
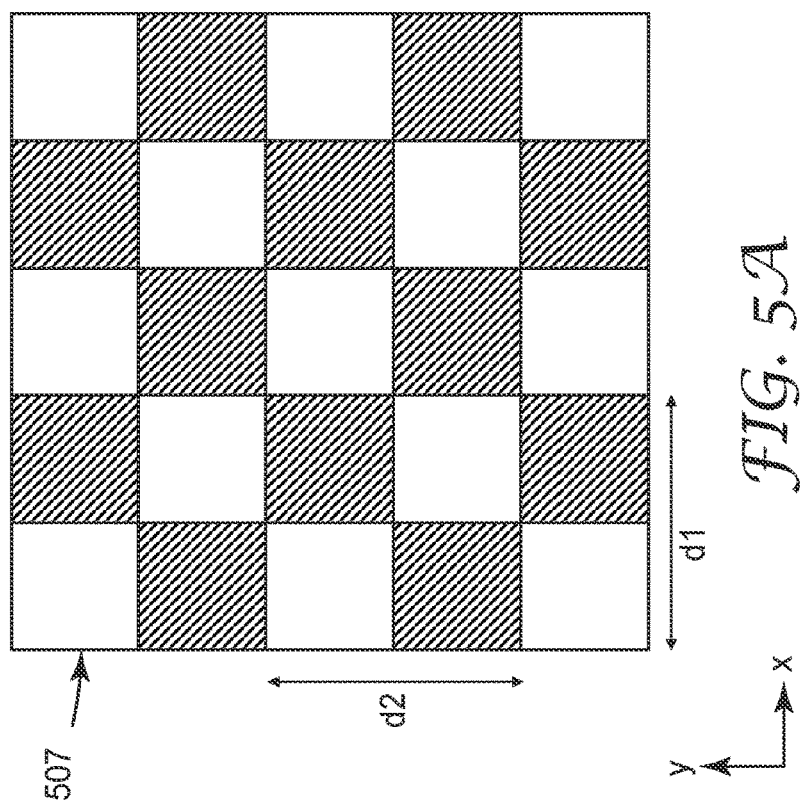
FIG. 5A is a schematic illustration of an object that can be displayed on a display panel.

In some embodiments, for an incident cone of light 440 having a full cone angle θ (full width at half maximum) of at least 10 degrees (e.g., 10 degrees to 60 degrees, or 15 degrees to 40 degrees, or 20 degrees to 35 degrees, or about 30 degrees) that is incident on the optical system 401 from an object 407 (e.g., displayed on display panel 405) having a spatial frequency of less than about 1 line pair per millimeter (e.g., about 0.1 to about 1 line pairs per millimeter), and that exits the optical system 401 through the exit surface 452 as an exiting cone of light 441, when the exiting cone of light 441 is imaged proximate the exit surface 452, the image has a plurality of alternating bright and dark regions. For example, FIG. 5A is a schematic illustration of an object 507 that can be displayed on display panel 405. Object 507 may extend over only a portion of the display panel. For example, a 14 squares×14 squares checkerboard pattern can be displayed on the display panel and a portion of this pattern (e.g., 10 squares×10 squares, or 6 squares×6 squares, or 5 squares×5 squares, or 4 squares×4 squares) checkerboard pattern near the center of the display panel) can be taken to be the object 507. Object 507 has a first spatial frequency of 1 line pair per unit distance d1 along a first direction (x-direction) and a second spatial frequency of 1 line pair per unit distance d2 along an orthogonal second direction (y-direction). The object 507 has a spatial frequency of less than about 1 line pair per millimeter if at least one of the first and second spatial frequencies is less than about 1 line pair per millimeter. In some embodiments, each of the first and second spatial frequencies is less than about 1 line pairs per millimeter. In some embodiments, Ib/Id≥50, where Ib is an average brightness of central 50% regions of the bright regions, and Id is an average brightness of central 50% regions of the dark regions. FIG. 5B is a schematic illustration of an image 509 formed light from the object 507 that has exited the optical system 401 through the exit surface 452. The image 509 may appear as the object 507 except for an overall scale or the image 509 may be distorted by the optical system (such distortion, if any, can be electronically corrected if desired). The image 509 has a plurality of alternating bright and dark regions 571 and 573. For each bright region 571, there is a central 50% region 576, and for each dark region 573, there is a central 50% region 579. The central 50% region 576 refers to a region in an interior region of a bright region 571 having an area of about 50% of the area of the bright region 571. Similarly, the central 50% region 579 refers to a region in an interior of a dark region 573 having an area of about 50% of the area of the dark region 573. The average brightness of central 50% regions 576 of the bright regions 571 is determined by averaging the brightness (intensity) over the central 50% regions 576. Similarly, the average brightness of central 50% regions 579 of the dark regions 573 is determined by averaging the brightness over the central 50% regions 579. The ratio Ib/Id can be measured separately for red, green and blue subpixels; or can be determined for a white light output; or can be determined for one or more wavelengths in the predetermined wavelength range, for example. A full cone angle θ of at least 10 degrees may be used in determining a measure of the contrast of the optical system, while other cone angles may be utilized when the optical system is used in display applications, for example. For example, in use, the optical system may include a display panel providing an incident cone of light having any suitable full cone angle (e.g., less than 10 degrees, about 10 degrees, or greater than 10 degrees).

In some cases, instead of using a display panel to display the object 407 or 507, the object 407 or 507 is produced by using a light emitting diode (LED) light source, for example, to illuminate a checkerboard pattern coated on a glass, for example (such patterns coated on glass are available from Precision Optical Imaging (Rush, NY), for example). Optical components may be included between the light source and the glass to produce a specified full cone angle θ. The LED may be a white LED and Id and Ib may be determined using a color camera in any one or more of the red, green, or blue color channels of the color camera, for example. Similar or substantially the same results for Ib/Id can be obtained by using a light source in a wavelength range corresponding to the wavelength range where the color channel of a color camera is sensitive and determining the brightness over the entire wavelength range of the light emitted by the light source. For example, utilizing a white light source and a green color channel of a color camera will give similar results for Ib/Id as using a light source having a wavelength distribution corresponding to the wavelengths of the green color channel of the color camera and determining the brightness over the entire wavelength range of the emitted light. In some embodiments, the incident cone of light used in determining Ib/Id includes wavelengths from at least 520 nm to 570 nm, and/or from at least 430 nm to 480 nm, and/or from at least 610 nm to 660 nm. In some embodiments, the light source emits light in the predetermined wavelength range.

Figure 6:
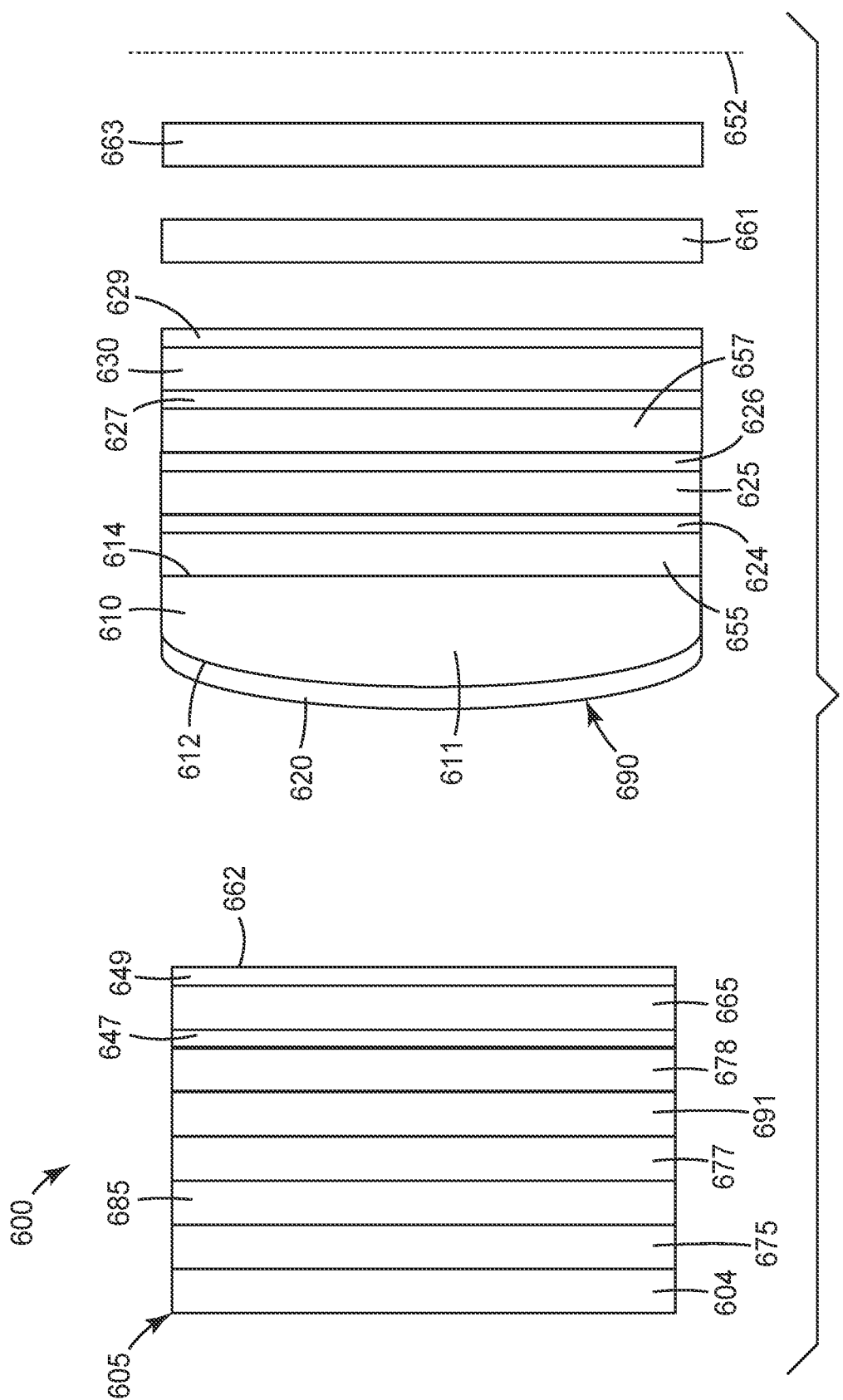
FIG. 6 is a schematic cross-sectional view of an optical system including a partial reflector facing a display panel.
Figure 7:
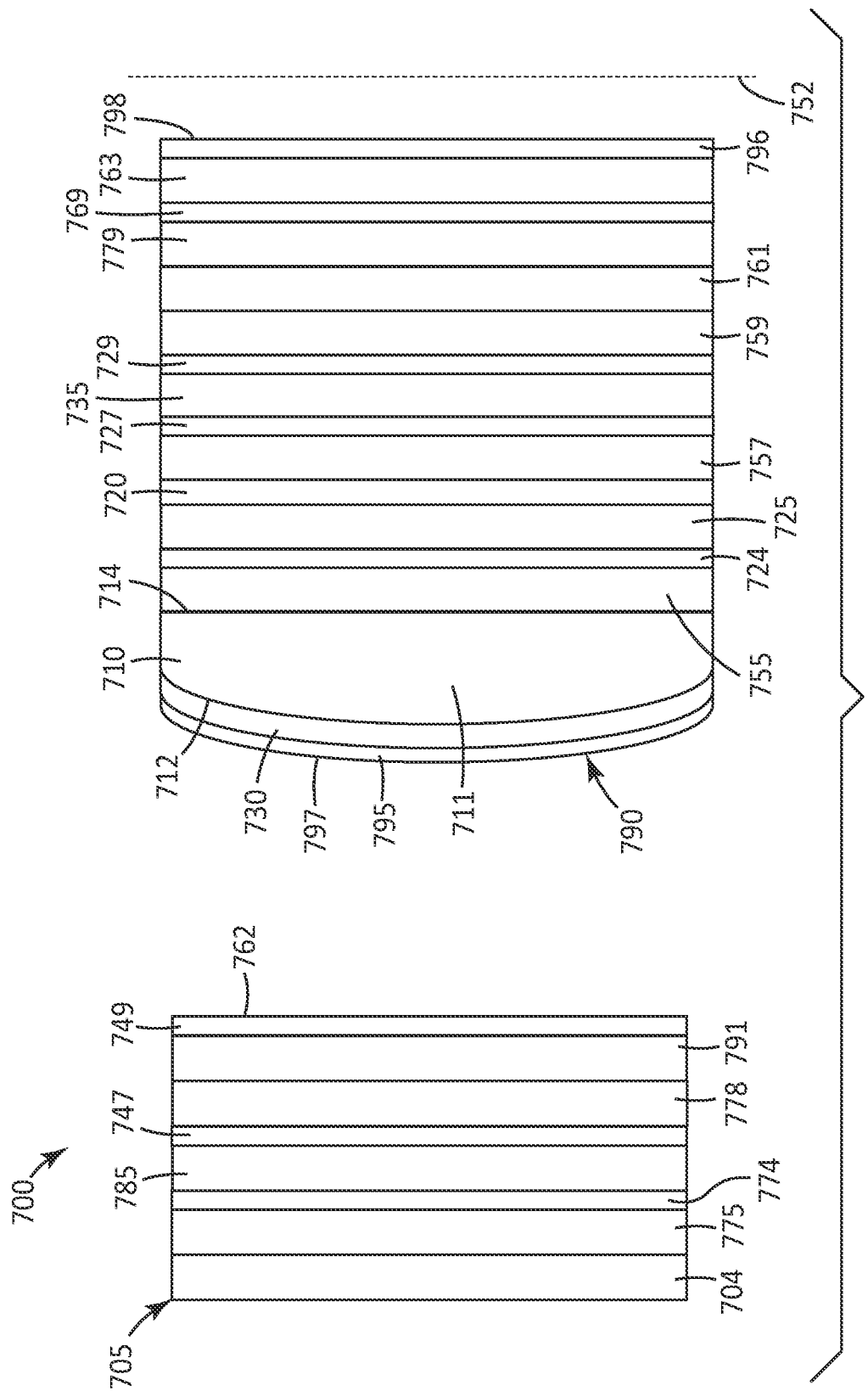
FIG. 7 is a schematic cross-sectional view of an optical system including a reflective polarizer facing a display panel.

In some embodiments, index matching layers, antireflection coatings, additional retarders, and/or optically absorptive polarizer(s) may be included in the optical system in order to reduce undesired reflections and thereby increase Ib/Id, for example. Any of the optical systems of the present description may have Ib/Id≥50, Ib/Id≥55, or Ib/Id≥60, or Ib/Id≥65, Ib/Id≥70, or Ib/Id≥72, or Ib/Id≥75, or Ib/Id≥76, or Ib/Id≥77, or Ib/Id≥78, for example. In some embodiments, the incident cone of light used to determine the Ib/Id in any of these ranges includes at least one wavelength in the predetermined wavelength range. In some embodiments, the incident cone of light used to determine the Ib/Id in any of these ranges includes wavelengths from at least 520 nm to 570 nm, and/or from at least 430 nm to 480 nm, and/or from at least 610 nm to 660 nm. In some embodiments, the incident cone of light includes wavelengths from at least 500 nm to 570 nm; and Ib/Id≥72, or Ib/Id≥75, or Ib/Id≥76, or Ib/Id≥77, or Ib/Id≥78. FIGS. 6-7 schematically illustrate two optical systems each including one or more index matching layers and one or more antireflection coatings. In some embodiments, one or more of the index matching layers, antireflection coatings, additional retarders, and/or optically absorptive polarizer(s) are omitted. In some embodiments, additional index matching layers, antireflection coatings, additional retarders, and/or optically absorptive polarizer(s) are included.

FIG. 6 is a schematic illustration of an optical system 600 including one or more optical lenses 610, a partial reflector 620, and a reflective polarizer 630. In some embodiments, the partial reflector 620 is disposed on and conforms to a curved major surface 612 of the one or more optical lenses 610 and the reflective polarizer 630 is disposed on and conforms to a major surface 614 of the one or more optical lenses 610. In the illustrated embodiment, the partial reflector 620 is disposed directly on the major surface 612 of the one or more optical lenses 610 and the reflective polarizer 630 is disposed indirectly on the major surface 614 of the one or more optical lenses 610. In the illustrated embodiment, only one optical lens 611 in the one or more optical lenses 610 is illustrated. In other embodiments, two or more optical lenses are included as described further elsewhere herein.

In some embodiments, the optical system 600 is configured to display an image (e.g., from display panel 605) to a viewer positioned proximate an exit surface 652 of the optical system 600. The reflective polarizer 630 is disposed between the partial reflector 620 and the exit surface 652. A retarder 625 is disposed between the partial reflector 620 and the reflective polarizer 630.

In the illustrated embodiment, the optical system 600 includes an integral optical stack 690. An integral optical stack is a stack of optical layers or components that are bonded to one another. The integral optical stack 690 includes, in sequence, the partial reflector 620, a first optical lens 611 in the one or more optical lenses 610, a first optically clear adhesive layer 655, the retarder 625, a second optically clear adhesive layer 657, and the reflective polarizer 630. In some embodiments, for at least one pair of adjacent layers in the integral optical stack 690, an index matching layer is disposed between the pair of adjacent layers. For example, in the illustrated embodiment, the integral optical stack 690 also includes a first index matching layer 624 disposed between the first optically clear adhesive layer 655 and the retarder 625, a second index matching layer 626 disposed between the retarder 625 and the second optically clear adhesive layer 657, and a third index matching layer 627 disposed between the second optically clear adhesive layer 657 and the reflective polarizer 630. In some embodiments, the integral optical stack 690 further comprises an antireflection coating 629 on a major surface of the reflective polarizer 630 opposite the second optically clear adhesive layer 657.

In some embodiments, the optical system 600 includes an optically absorptive polarizer 661 disposed between the exit surface 652 and the reflective polarizer 630. Such an optically absorptive polarizer can be used as a clean-up polarizer. In some embodiments, the optically absorptive polarizer 661 has an average optical absorption of greater than about 50%, or greater than about 60%, or greater than about 70%, or greater than about 80%, for the first (block) polarization state in the predetermined wavelength range. In some embodiments, the optical system 600 includes a retarder 663 disposed between the optically absorptive polarizer 661 and the exit surface 652. The retarder 663 may be included so that reflections back into the optical system (e.g., from a viewer's eye) are rotated substantially to the block state of the optically absorptive polarizer 661 after passing through the retarder 663 when exiting and when reentering the optical system 600.

In some embodiments, the optical system 600 includes a display panel 605 having an outermost major surface 662 facing the one or more optical lenses. In some embodiments, the outermost major surface 662 of the display panel 605 includes an antireflection coating 649. The antireflection coating 649 can be included to prevent light reflected from the partial reflector 620 towards the display panel 605 from being reflected back towards the partial reflector 620. In some embodiments, the display panel 605 includes at least one of a retarder 665 and an optically absorptive polarizer 691, where the antireflection coating 649 of the display panel 605 is disposed on the retarder 665 or the absorbing polarizer 691. In the illustrated embodiment, a retarder 665 and an optically absorptive polarizer 691 are included where the antireflection coating 649 is disposed on the retarder 665. In some embodiments, an index matching layer 647 is disposed between the optically absorptive polarizer 691 and the retarder 665. In the illustrated embodiment, display panel 605 includes, in sequence, a first display panel 604, a first optically clear adhesive layer 675, a retarder 685, a second optically clear adhesive layer 677, the optically absorptive polarizer 691, a third optically clear adhesive layer 678, the index matching layer 647, the retarder 665, and the antireflection coating 649. Additional index matching layers (e.g., on each major surface of the retarder 685) may also be included. The first display panel 604 may be configured to emit unpolarized light and the retarder 685, second optically clear adhesive layer 677, and the optically absorptive polarizer 691 may together be a circular polarizer (e.g., a circular polarizer as is commonly included in an organic light emitting diode (OLED) display). The optically absorptive polarizer 691 and the retarder 665 can be included so that light is incident on the partial reflector 620 in a circularly polarized state and then is incident on the reflective polarizer 630 after passing through the retarder 625 in a block state of the reflective polarizer 630.

FIG. 7 is a schematic illustration of an optical system 700 including one or more optical lenses 710, a partial reflector 720, and a reflective polarizer 730. In some embodiments, the reflective polarizer 730 is disposed on and conforms to a curved major surface 712 of the one or more optical lenses 710 and the partial reflector 720 is disposed on and conforms to a major surface 714 of the one or more optical lenses 710. In the illustrated embodiment, the reflective polarizer 730 is disposed directly on the major surface 712 of the one or more optical lenses 710 and the partial reflector 720 is disposed indirectly on the major surface 714 of the one or more optical lenses 710. In the illustrated embodiment, only one optical lens 711 in the one or more optical lenses 710 is illustrated. In other embodiments, more than one optical lens 711 is included as described further elsewhere herein.

In some embodiments, the optical system 700 is configured to display an image (e.g., from display panel 705) to a viewer positioned proximate an exit surface 752 of the optical system 700. The partial reflector 720 is disposed between the reflective polarizer 730 and the exit surface 752. A retarder 725 is disposed between the reflective polarizer 730 and the partial reflector 720. The reflective polarizer 730 may be an optical film reflective polarizer as described further elsewhere herein.

In some embodiments, as described further elsewhere herein, the reflective polarizer 630 or 730 includes a plurality of polymeric layers where each polymeric layer having an average thickness of less than about 500 nm. In some embodiments, for a substantially normally incident light in a predetermined wavelength range extending at least from about 450 nm to about 600 nm: the partial reflector 620 or 720 has an average optical reflectance of at least 30%, and the plurality of polymeric layers has an average optical reflectance Rs for a first polarization state, 50%≤Rs≤95%, and an average optical transmittance Tp≥80% for an orthogonal second polarization state. In some embodiments, Tp≥80%, Rp≤1%, and 50%≤Rs≤95%. In some embodiments, Tp≥85% or Tp≥90%. In some embodiments, Rp≤0.8%, or Rp≤0.6%, or Rp≤0.4%, or Rp≤0.25%, or Rp≤0.2%. In some embodiments, 80%≤Rs≤95% or 85%≤Rs≤95%. In some embodiments, for a substantially normally incident light in the predetermined wavelength range, the plurality of polymeric layers has an average optical transmittance Ts of less than about 10%, or less than about 5% for the first polarization state. In some embodiments, as described further elsewhere herein, for an incident cone of light having a full cone angle of at least 10 degrees that is incident on the optical system 600 or 700 from an object comprising a spatial frequency of less than about 1 line pair per millimeter, and exits the optical system 600 or 700 through the exit surface 652 or 752 as an exiting cone of light, when the exiting cone of light is imaged proximate the exit surface 652 or 752, the image has a plurality of alternating bright and dark regions. In some embodiments, Ib/Id≥50 where Ib is an average brightness of central 50% regions of the bright regions, and Id is an average brightness of central 50% regions of the dark regions. In some embodiments, Ib/Id≥55, Ib/Id≥60, or Ib/Id≥65, Ib/Id≥70, or Ib/Id≥72, or Ib/Id≥75, or Ib/Id≥76, or Ib/Id≥78. In some embodiments, each central 50% region of the bright regions is an interior region of a bright region having an area of about 50% of an area of the bright region, and each central 50% region of the dark regions is an interior region of a dark region having an area of about 50% of an area of the dark region.

In the illustrated embodiment, the optical system 700 includes an integral optical stack 790. The integral optical stack includes, in sequence, the reflective polarizer 730, a first optical lens 711 in the one or more optical lenses 710, a first optically clear adhesive layer 755, a retarder 725, and the partial reflector 720. In some embodiments, the integral optical stack 790 further includes, in sequence, a second optically clear adhesive layer 757 disposed on the partial reflector 720 opposite the retarder 725, a second retarder 735, a third optically clear adhesive layer 759, an optically absorptive polarizer 761 which may have an average optical absorption of greater than about 50% for the first polarization state in the predetermined wavelength range, and a third retarder 763. In some embodiments, the integral optical stack 790 further includes a fourth optically clear adhesive layer 779 between the optically absorptive polarizer 761 and the third retarder 763. In some embodiments, for at least one pair of adjacent layers in the integral optical stack 790, an index matching layer is disposed between the pair of adjacent layers. For example, in the illustrated embodiment, an index matching layer 724 is disposed between the first optically clear adhesive layer 755 and the retarder 725, an index matching layer 727 is disposed between the second optically clear adhesive layer 757 and the retarder 735, an index matching layer 729 is disposed between the retarder 735 and the third optically clear adhesive layer 759, and an index matching layer 769 is disposed between the fourth optically clear adhesive layer 779 and the third retarder 763. In some embodiments, the integral optical stack has outermost first and second major surfaces 797 and 798, and each of the outermost first and second major surfaces 797 and 798 has an antireflection coating 795 and 796, respectively. The retarder 763 may be included so that reflections back into the optical system (e.g., from a viewer's eye) are rotated substantially to the block state of the optically absorptive polarizer 761 after passing through the retarder 763 when exiting and when reentering the optical system 700.

Optical system 700 includes a display panel 705 having an outermost major surface 762 facing the one or more optical lenses 710. In some embodiments, the outermost major surface 762 of the display panel 705 includes an antireflection coating 749. In some embodiments, the display panel 705 includes at least one of a retarder 785 or an optically absorptive polarizer 791, and the antireflection coating 749 of the display panel 705 is disposed on the retarder 785 or the optically absorptive polarizer 791. In the illustrated embodiment, the display panel 705 includes, in sequence, a first display panel 704, a first optically clear adhesive layer 775, an index matching layer 774, a retarder 785, an index matching layer 747, a second optically clear adhesive layer 778, an optically absorptive polarizer 791, and an antireflection coating 749 at the outermost major surface 762. The optically absorptive polarizer 791 may be included so that light from the display panel 705 is incident on the reflective polarizer 730 in the pass polarization state of the reflective polarizer 730.

Any suitable index matching layer or antireflection coating may be used in any of the optical systems. An index matching layer between two adjacent layers or components typically has at least one refractive index between that of the two adjacent layers or components. In some embodiments, an index matching layer includes two or more sublayers to provide a more gradual shift in refractive index compared to using a single layer. An antireflection coating may be a single layer (e.g., a nanostructured antireflection layer) or may include two or more sublayers. For example, alternating layers of differing refractive indices with thicknesses selected to result in destructive interference may be used. The index matching layer(s) and/or antireflection coating(s) may include one or more inorganic layers, such as layers of alumina, titania, silica, $MgF_2$, for example.

Any suitable optically clear adhesives may be used for the optically clear adhesive layers. An optically clear adhesive is an adhesive with a suitably high transmittance in the predetermined wavelength range (e.g., a transmittance of at least 80%, or at least 85%, or at least 90% for substantially normally incident substantially unpolarized light in the predetermined wavelength range) and a suitably low haze (e.g., a haze of less than 20%, or less than 10%, or less than 5% as determined by the ASTM D1003-13 test standard).

Figure 8:
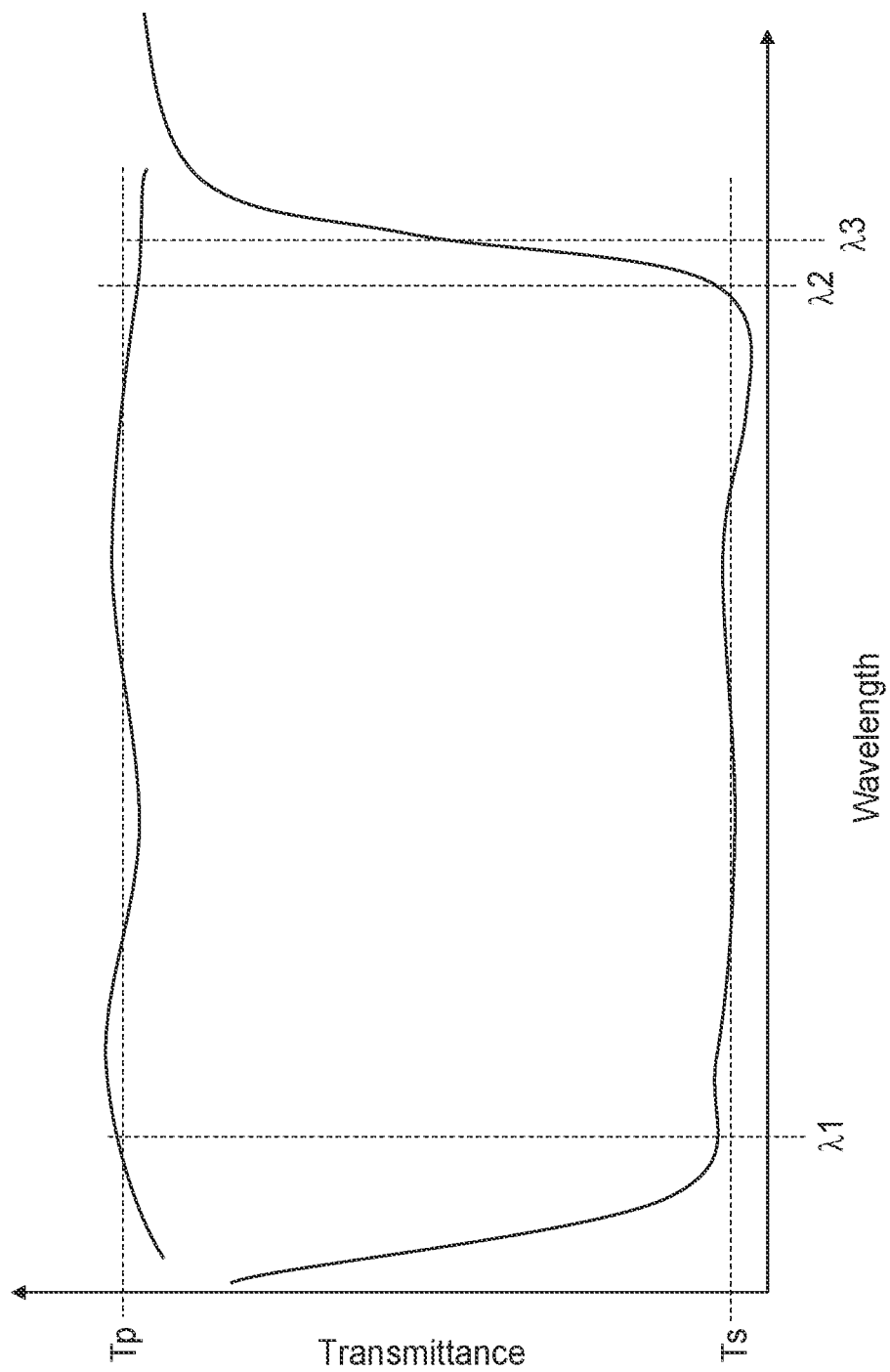
FIG. 8 is a schematic plot of the transmittance of an optical film, or of a plurality of polymeric layers included in the optical film, as a function of wavelength.

FIG. 8 is a schematic plot of the transmittance of an optical film, or of a plurality of polymeric layers (e.g., a plurality of interference layers reflecting and transmitting light primarily by optical interference and/or alternating first and second polymeric layers) included in the optical film, for orthogonal first and second polarization states for substantially normally incident light. The average of the transmittance over wavelengths in the predetermined wavelength range from $\lambda 1$ to $\lambda 2$ is Ts in the first polarization state and Tp in the second polarization state. In some embodiments, $\lambda 1$ is in a range from about 400 nm to about 450 nm, and $\lambda 2$ is in a range from about 600 nm to about 700 nm or from about 650 nm to about 700 nm.

Figure 9:
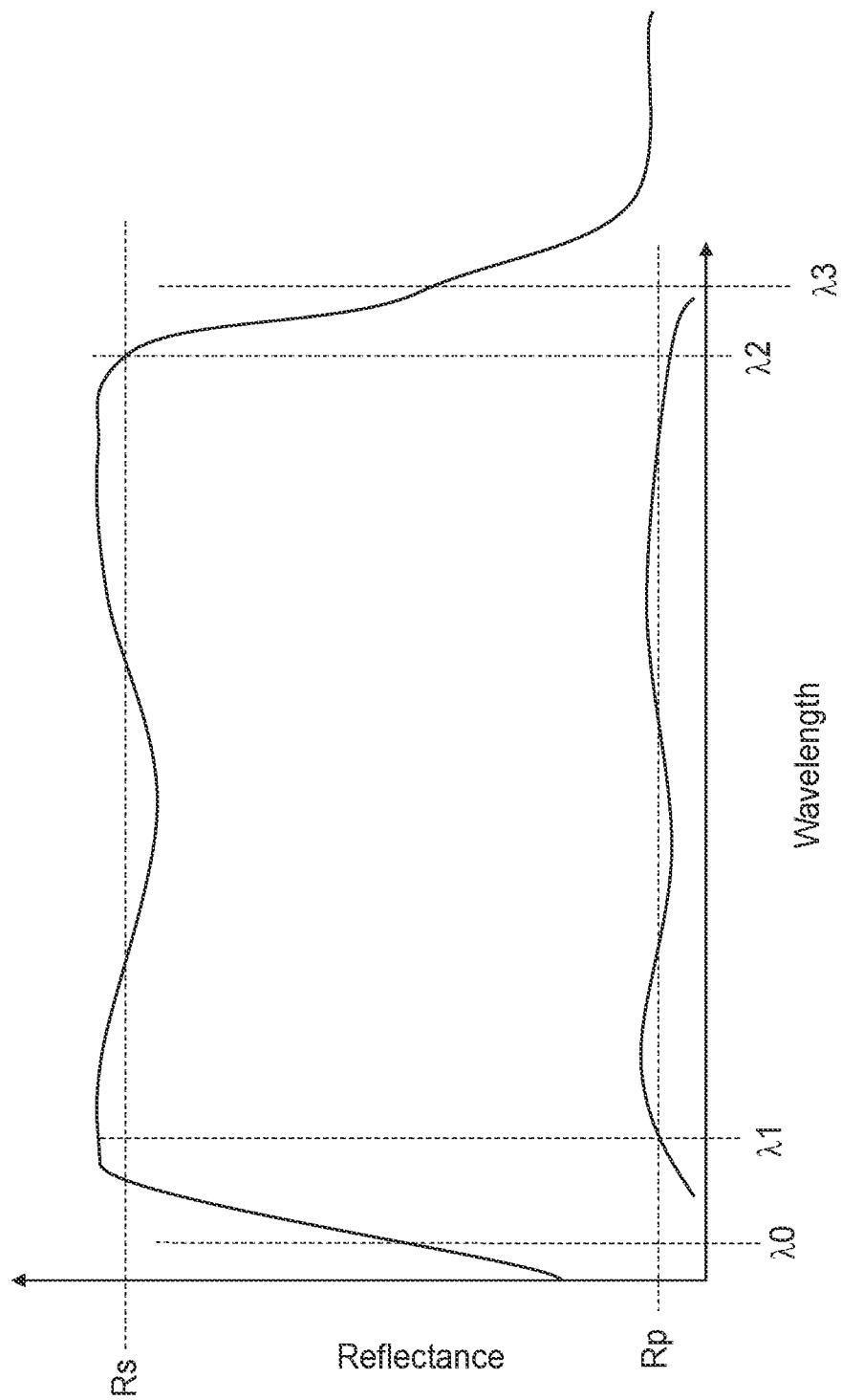
FIG. 9 is a schematic plot of the reflectance of an optical film, or of a plurality of polymeric layers included in the optical film, as a function of wavelength.

FIG. 9 is a schematic plot of the reflectance of an optical film, or of a plurality of polymeric layers (e.g., a plurality of interference layers reflecting and transmitting light primarily by optical interference and/or alternating first and second polymeric layers) included in the optical film, for orthogonal first and second polarization states for substantially normally incident light. The average of the reflectance over wavelengths in the predetermined wavelength range from $\lambda 1$ to $\lambda 2$ is Rs in the first polarization state and Rp in the second polarization state.

The transmittance and/or reflectance shown in FIGS. 8-9 may be for a location on an optical film and each location on the film may have a corresponding transmittance and reflectance which may vary somewhat from location to location due to a forming (e.g., thermoforming) process, for example. For example, each location may have a corresponding reflection band generally as illustrated in FIG. 9, but the band edge wavelengths $\lambda 0$ and/or $\lambda 3$ may vary somewhat with position. An optical film may be said to have an average transmittance and/or reflectance in a specified range if at least one location on the optical film has an average transmittance and/or reflectance in the specified range. In some embodiments, each location in at least a majority of the area of the optical film, or each location in all or substantially all of the area of the optical film may have the specified average transmittance and/or reflectance.

A long wavelength band edge 23 is illustrated in FIGS. 8-9 and a short wavelength band edge $\lambda 0$ is indicated in FIG. 9. Reflection bands typically have both long and short wavelength band edges where the reflectance rapidly drops. In the illustrated embodiment, the short wavelength band edge $\lambda 0$ is less than $\lambda 1$ and the long wavelength band edge $\lambda 3$ is greater than $\lambda 2$. The band edges are determined for substantially normally incident light. The precise wavelength of a band edge can be defined using several different criteria. The wavelength of the band edge may be can be taken to be the wavelength where the reflectance for normally incident light having the first polarization state drops to ½ Rs or the wavelength where the transmittance for normally incident light having the first polarization state increases to 10%, for example.

The materials used in the manufacture of multilayer optical films are typically polymer materials that have very low absorption at least over visible and near-visible wavelengths and for typical optical path distances within the film. Thus, the % reflection R and the % transmission T of a multilayer film for a given light ray are typically substantially complementary, i.e., $R+T \approx 100\%$, usually within an accuracy of about 1%.

The transmittance of an optical film refers generally to the transmitted light intensity divided by the incident light intensity (for light of a given wavelength, incident direction, etc.), but may be expressed in terms of "external transmittance" or "internal transmittance". The external transmittance of an optical film is the transmittance of the optical film when immersed in air, and without making any corrections for Fresnel reflections at the air/element interface at the front of the element or for Fresnel reflections at the element/air interface at the back of the element. The internal transmittance of an optical film is the transmittance of the film when the Fresnel reflections at its front and back surfaces have been removed. The removal of the front and back Fresnel reflections may be done either computationally (e.g. by subtracting an appropriate function from the external transmission/reflection spectrum which can be determined from the Fresnel equations and measured refractive indices of the outermost layers of the optical film), or experimentally (e.g., the internal transmittance and internal reflectance can be extracted from measurements of reflectance and transmittance of the optical film with and without an absorptive polarizer disposed on the front sides of the optical film and suitably aligned with the optical film, measurements of reflectance and transmittance of the optical film with and without absorptive polarizers disposed on the front and the back sides of the optical film and suitably aligned with the optical film, and measurements of the reflectance and transmittance of the absorbing polarizer). For many types of polymer and glass materials, the Fresnel reflections are about 4 to 6% (for normal or near-normal angles of incidence) at each of the two outer surfaces, which results in a downward shift of about 10% for the external transmittance relative to the internal transmittance.

Thus, the internal transmission of an optical film refers to the transmission that results only from interior portions of the film component, and not the two outer surfaces thereof. Analogous to internal transmission is "internal reflection". The internal reflection of a film refers to the reflection that results only from interior portions of the film component, and not the two outermost surfaces thereof. The transmittance or reflectance of an optical film may also be determined for the film immersed in some medium such as a glass. For example, if a glass has a refractive index close to that of the outer layers of the optical film and an index matched adhesive is used to bond the optical film to glass (e.g., a glass prism) on each side of the optical film, the normally incident transmittance and reflectance of the optical film immersed in the glass will be approximately equal to the normally incident internal transmittance and reflectance, respectively. If transmittance or reflectance is referred to herein without being specified as internal or external, it should be assumed that the transmittance or reflectance refers to internal transmittance or internal reflectance, respectively, unless otherwise indicated by the context.

The internal reflection and transmission characteristics can be readily determined from optical modeling or from laboratory measurements. In the case of calculated values of reflectivity and transmission for a modeled film, the internal reflection and transmission is readily accomplished by omitting the calculation of those surface reflectivities from the computed value. The reflection spectrum and all of its features such as the reflectivity at any angle and the band edges for birefringent multilayer films can be calculated using the 4×4 stack code of Berreman and Scheffer, Phys. Rev. Lett. 25, 577 (1970). A description of this method is given in the book "Ellipsometry and Polarized Light" written by Azzam and Bashara, published by Elsevier Science, Holland.

In the case of measured values of reflectivity or transmission, the internal reflection and transmission characteristics can be determined by taking measurements of the film in air and subtracting a calculated or measured value representative of only the surface reflectivities. For example, given a multilayer film having a smooth and clear surface layer which is much thicker than the interference layers, the index of refraction of this surface layer can be measured. Once the index of the surface layer is known, the surface reflectivity can be subtracted from the total measured reflectivity by using mathematical formulas which are well known in the art.

Figure 10B:
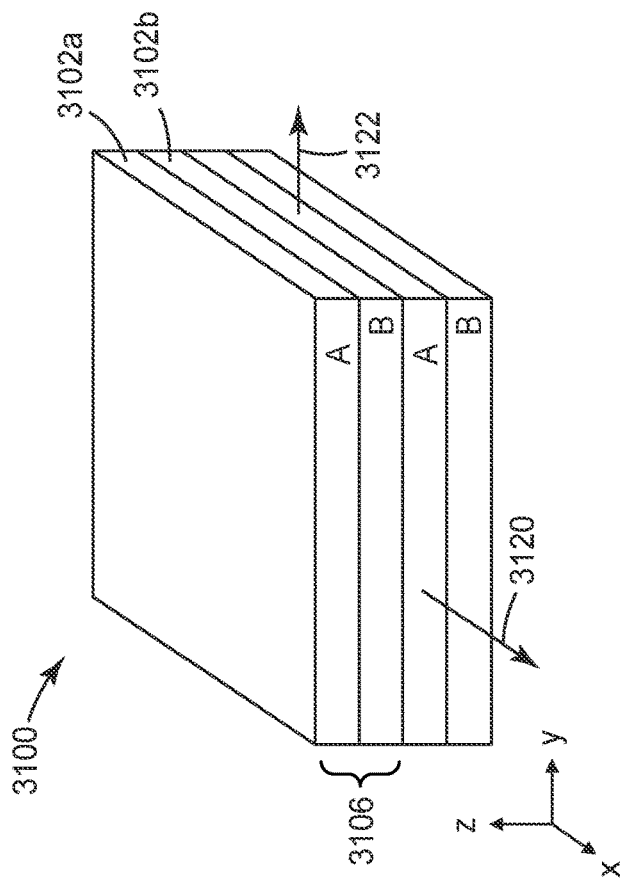
FIG. 10B is a schematic perspective view of a segment of the optical film of FIG. 10A.
Figure 10A:
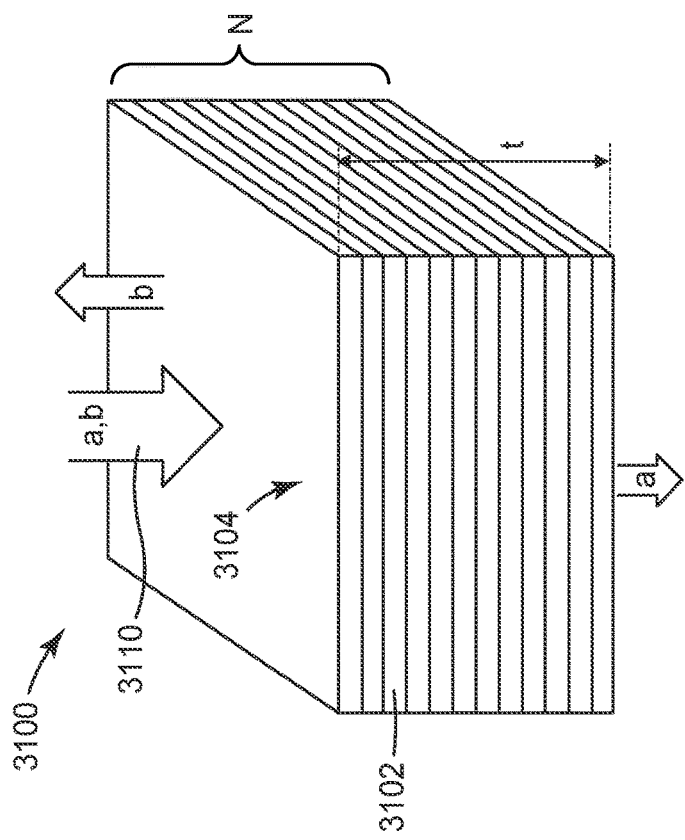
FIG. 10A is a schematic perspective view of an optical film.

FIG. 10A is a schematic perspective view of an optical film 3100 which may be a reflective polarizer and may be used in any of the optical systems described elsewhere herein. FIG. 10B is a schematic perspective view of a segment of the optical film 3100. Optical film 3100 includes a plurality of polymeric interference layers 3102 having a total of (N) interference layers. FIG. 10B illustrates alternating higher index (A-layers) and lower index (B-layers) polymeric layers 3102a and 3102b. The higher index layers have an index in at least one direction greater than an index of the lower index layers in the same direction. The lower index layers 3102b may be referred to as first layers and the higher index layers 3102a may be referred to as second layers. In some embodiments, for a substantially normally incident light in a predetermined wavelength range extending at least from about 450 nm to about 600 nm, a maximum index of refraction of the second polymeric layer is greater than a maximum index of refraction of the first polymeric layer, and a difference between the maximum index of refraction of the second polymeric layer and a minimum index of refraction of the first polymeric layer is less than about 0.3, or less than about 0.28, or in a range of about 0.2 to about 0.3, or in a range of about 0.22 to about 0.28, or is about 0.25. Since substantially normally incident light is referred to, the maximum and minimum indices of refraction are substantially in-plane indices.

In some embodiments, the plurality of alternating first and second polymeric layers 3102b and 3102a include less than about 900 layers, or less than about 500 layers, or less than about 300 layers, or include a total number (N) of layers in a range of about 200 to about 300 layers. In some embodiments, optical film 3100 has an average thickness t of less than about 500 microns. The average thickness refers to the thickness average over the area of the optical film. In some embodiments, the thickness is substantially uniform so that the thickness of the optical film is substantially equal to the average thickness t. In some embodiments, the optical film is formed into a curved shape and has a thickness variation resulting from the forming process. In some embodiments, each polymeric layer 3102 has an average thickness of less than about 500 nm.

During use, light incident on a major surface of optical film 3100 (e.g., film surface 3104), depicted by incident light 3110 may enter a first layer of optical film 3100 and propagate through the plurality of interference layers 3102, undergoing select reflection or transmission by optical interference depending on the polarization state of incident light 3110. Incident light 3110 may include a first polarization state (b) and a second polarization state (a) that are be mutually orthogonal to one another. In some embodiments, the optical film 3100 is a polarizer and the second polarization state (a) may be considered as the "pass" state while the first polarization state (b) may be considered as the "block" state. In some embodiments, optical film 3100 is a polarizer oriented along a stretch axis 3120 and not oriented along an orthogonal axis 3122. In such embodiments, the polarization state of normally incident light having an electric field along the axis 3122 is the second polarization state (a) and the polarization state of normally incident light having an electric field along the axis 3120 is the first polarization state (b). In some embodiments, as incident light 3110 propagates through plurality of interference layers 3102, portions of the light in the first polarization state (b) is reflected by adjacent interference layers resulting in the first polarization state (b) being reflected by optical film 3100, while a portion of the light in the second polarization state (a) collectively passes through optical film 3100.

Interference layers may be described as reflecting and transmitting light primarily by optical interference when the reflectance and transmittance of the interference layers can be reasonably described by optical interference or reasonably accurately modeled as resulting from optical interference. Adjacent pairs 3106 of interference layers having different refractive indices reflect light by optical interference when the pair has a combined optical thickness (refractive index along the block axis times physical thickness) of ½ the wavelength of the light. In some embodiments, the optical thicknesses of adjacent pairs 3106 of interference layers in an optical repeat unit are about equal. Interference layers typically have a physical thickness of less than about 500 nm or less than about 200 nanometers. In some embodiments, each polymeric interference layer has an average thickness (unweighted average of the physical thickness over the layer) in a range of about 45 nanometers to about 200 nanometers. Noninterference layers have an optical thickness too large to contribute to the reflection of visible light via interference. Noninterference layers typically have a physical thickness of at least 1 micrometer, or at least 5 micrometers. The interference layers 3102 may be a plurality of polymeric interference layers reflecting and transmitting light primarily by optical interference in the predetermined wavelength range. The average thickness of the optical film including the interference layers and the non-interference layers may be less than about 500 microns.

Suitable materials for the alternating polymeric layers include, for example, polyethylene naphthalate (PEN), copolymers containing PEN and polyesters (e.g., polyethylene terephthalate (PET) or dibenzoic acid), glycol modified polyethylene terephthalate, polycarbonate (PC), or blends of these classes of materials.

Methods of making optical films including alternating polymeric interference layers are known in the art and are described in U.S. Pat. No. 5,882,774 (Jonza et al.), U.S. Pat. No. 6,179,948 (Merrill et al.), U.S. Pat. No. 6,783,349 (Neavin et al.), and U.S. Pat. No. 9,162,406 (Neavin et al.), for example. In brief summary, the fabrication method can include: (a) providing at least a first and a second stream of resin corresponding to the first and second polymers to be used in the finished film; (b) dividing the first and the second streams into a plurality of layers using a suitable feedblock; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. After the multilayer web is cooled on the chill roll, it can be drawn or stretched to produce a finished or near-finished multilayer optical film. The drawing or stretching accomplishes two goals: it thins the layers to their desired final thicknesses, and it orients the layers such that at least some of the layers become birefringent. The orientation or stretching can be accomplished along the cross-web direction (e.g., via a tenter), along the down-web direction (e.g., via a length orienter), or any combination thereof, whether simultaneously or sequentially.

In some embodiments, the reflective polarizer comprises a plurality of alternating first and second polymeric layers, where each second polymeric layer is substantially uniaxially oriented (e.g., along axis 3120 depicted in FIG. 10B) at one or more locations (e.g., at all location when the reflective polarizer is substantially planar and at locations from an apex of a curved reflective polarizer along an arc generally along the block axis of the reflective polarizer). A substantially uniaxially oriented layer has indices of refraction in one in-plane (e.g., length) direction and a thickness direction that are substantially the same (e.g., within 0.02 or within 0.01), but substantially different (e.g., a least 0.05 different) from an index of refraction in an orthogonal in-plane (e.g., width) direction. In some embodiments, the multilayer optical film, prior to thermoforming, is a substantially uniaxially drawn film and has a degree of uniaxial character U of at least 0.7, or at least 0.8, or at least 0.85, where U=(1/MDDR−1)/(TDDR$^{1/2}$−1) with MDDR defined as the machine direction draw ratio and TDDR defined as the transverse direction draw ratio. Such substantially uniaxially oriented multilayer optical films are described in U.S. Pat. Appl. No. 2010/0254002 (Merrill et al.) and can be obtained by using a parabolic tenter to orient the multilayer film. As described in U.S. Pat. No. 9,557,568 (Ouderkirk et al.) substantially uniaxially oriented reflective polarizer films offer improved performance in folded optical systems. In some embodiments, the second layers the plurality of alternating first and second polymeric layers have refractive indices in the pass and thickness directions than differ by less than about 0.008 (e.g., a difference greater than about 0.002 and less than about 0.008).

In some embodiments, the plurality of alternating first and second polymeric layers has an average optical reflectance Rs for the first polarization state, and an average optical transmittance Tp and an average optical reflectance Rp for the second polarization state, where Tp≥80%; Rp≤1%, or Rp≤0.8%, or Rp≤0.6%, or Rp≤0.4%, or Rp≤0.25%; and 80%≤Rs≤95%. The reflectivity for the pass state (second polarization state) can be made desirably low by closely matching the refractive indices in the pass direction for the first and second layers (e.g., a difference less than about 0.006 or less than about 0.005) and/or by limiting the number of alternating first and second polymeric layers (e.g., in some embodiments, the alternating first and second polymeric layers number between 200 and 500, and in some embodiments, the plurality of alternating first and second polymeric layers include less than about 300 layers). The reflectivity in the block direction (first polarization state) can be desirably high (e.g., 80%≤Rs≤95%) when a limited number of layers are included by utilizing significantly different refractive indices in the block direction for the first and second layers (e.g., a difference greater than about 0.2 or greater than about 0.22).

The refractive indices in the pass direction for the first and second layers can be closely matched by a suitable choice of materials and by a suitable choice of draw ratios MDDR and TDDR. In some cases, for a given TDDR, the MDDR is reduced below what is commonly utilized in film processes in order to produce a lower Rp. Utilizing such a low MDDR can cause buckling in the optical film during processing, but areas of the optical film free of buckles and large enough to be used in the optical systems of the present description are produced. For example, isotropic first layers of 85 wt. % polycarbonate blended with 15 wt % PETG (glycol modified polyethylene terephthalate) had refractive indices of n1x, n1y and n1z each about 1.5792 at a wavelength of about 550 nm and each about 1.5705 at a wavelength of 633 nm; and oriented second layers of 90/10 coPEN, a polymer composed of 90% polyethylene naphthalate (PEN) and 10% polyethylene terephthalate (PET), oriented with draw ratios of TDDR of about 6 and MDDR of about 0.43 had refractive indices n2x, n2y and n2z of about 1.8372, 1.5755, and 1.5690, respectively, at a wavelength of about 550 nm and of about 1.8120, 1.5652, and 1.5587, respectively, at a wavelength of about 633 nm. This provided a reasonably close match between refractive indices in the pass direction for the first and second layers.

In some embodiments, the reflective polarizer includes a plurality of alternating first and second polymeric layers, where each second polymeric layer is substantially uniaxially oriented at one or more locations. In some embodiments, the reflective polarizer includes at least one layer that is substantially optically uniaxial at at least one location on the at least one layer away from the optical axis passing through an apex of the reflective polarizer. In some embodiments, the at least one layer at the at least one location has a first refractive index in a thickness direction, a second refractive index in a second direction orthogonal to the thickness direction, and a third refractive index in a third direction orthogonal to the thickness direction and to the second direction, where an absolute value of a difference in the first and second refractive indices is less than 0.02, or less than 0.01, or less than 0.008; and an absolute value of a difference in the second and third refractive indices is greater than 0.05, or greater than 0.1, or greater than 0.15, or greater than 0.2.

The refractive indices of the first and second polymeric layers can be expressed in terms of refractive index components along directions defined by orthogonal polarization states for substantially normally incident light and/or can be expressed in terms of refractive index components along orthogonal first and second axes in a plane of the optical film. In some embodiments, for each pair of adjacent first and second polymeric layers: the first layer 3102b has an index n1x along the first polarization state (e.g., polarized along axis 3120 or along the x-axis), an index of refraction n1y along the second polarization state (e.g., polarized along axis 3123 or along the y-axis), and an index n1z along a z-axis orthogonal to the first and second polarization states; and the second layer 3102a has an index n2x along the first polarization state, an index of refraction n2y along the second polarization state, and an index n2z along the z-axis. In some embodiments, for each pair of adjacent first and second polymeric layers: the first layer 3102b has an index n1x along a first axis in a plane of the optical film (e.g., axis 3120 or the x-axis), an index of refraction n1y along an orthogonal second axis in the plane of the optical film (e.g., axis 3123 or the y-axis), and an index n1z along a z-axis orthogonal to the first and second axes; and the second layer 3102a has an index n2x along the first axis, an index of refraction n2y along the second axis, and an index n2z along the z-axis. The plane of the optical film generally refers to a plane tangent to the optical film. If the optical film is disposed in a plane, this plane is the plane of the optical film. If the optical film is curved (e.g., disposed on and conforming to a curved surface of a lens), the plane of the optical film is the tangent plane at the location where the refractive indices are specified. Substantially normally incident light may be polarized in a first polarization state along the first axis (i.e., the first polarization state may be a linear polarization state having the electric field along the first axis) or in a second polarization state polarization state along the second axis (i.e., the second polarization state may be a linear polarization state having the electric field along the second axis), for example, and the optical film may have a reflectance and transmittance for the first and second polarization states in any of the ranges described elsewhere herein.

In some embodiments, for at least one wavelength in a predetermined wavelength range extending at least from about 450 nm to about 600 nm: a maximum difference between n1x, n1y and n1z is less than about 0.002; and a difference between n2x and n1x is greater than about 0.2. In some embodiments, for the at least one wavelength in the predetermined wavelength range, a difference between n2y and n2z is greater than about 0.002 and less than about 0.008. In some embodiments, for the at least one wavelength in the predetermined wavelength range, an absolute value of a difference between n1y and n2y is less than about 0.006, or less than about 0.005. In some embodiments, for the at least one wavelength in the predetermined wavelength range, a difference between n2x and n1x is in a range of about 0.22 to about 0.28. The indices of refraction can be adjusted by a suitable selection of polymers for the first and second layers any by a suitable degree of orientation of the layers (e.g., increasing draw ratio can increase the refractive index in the stretch direction in the oriented (higher index) layers). The indices of refraction may be specified for at least one wavelength in the predetermined wavelength range, for example, and/or may be specified at a fixed reference wavelength (e.g., 532 nm or 550 nm or 633 nm). For example, in some embodiments, at a wavelength of about 550 nm, n1x, n1y and n1z are each about 1.5792 and n2x, n2y and n2z are about 1.8372, 1.5755, and 1.5690, respectively. In some embodiments, at a wavelength of about 633 nm, n1x, n1y and n1z are each about 1.5705 and n2x, n2y and n2z are about 1.8120, 1.5652, and 1.5587, respectively. In some embodiments, the optical film has refractive indices in any of these ranges at at least one location on the optical film. In some embodiments, the optical film has refractive indices in any of these ranges over at least 80%, or at least 90%, or substantially all, of a total area of the optical film.

In some embodiments, the optical system includes a retarder disposed between the partial reflector and the reflective polarizer. In some embodiments, the retarder disposed between the partial reflector and the reflective polarizer has a quarter wave retardance at one or more wavelengths in the predetermined wavelength range. In some embodiments, the optical system includes a plurality of retarders (e.g., the plurality of retarders depicted in FIG. 6 or in FIG. 7). In some embodiments, each retarder has a quarter wave retardance at one or more wavelengths in the predetermined wavelength range.

The retarder layer(s) used in the optical systems of the present description can be films or coatings or a combination of films and coating. Suitable films include birefringent polymer film retarders such as those available from Meadowlark Optics (Frederick, CO), for example. Suitable coatings for forming a retarder layer include the linear photopolymerizable polymer (LPP) materials and the liquid crystal polymer (LCP) materials described in U.S. Pat. App. Pub. Nos. 2002/0180916 (Schadt et al.), 2003/028048 (Cherkaoui et al.), 2005/0072959 (Moia et al.) and 2006/0197068 (Schadt et al.), and in U.S. Pat. No. 6,300,991 (Schadt et al.). Suitable LPP materials include ROP-131 EXP 306 LPP and suitable LCP materials include ROF-5185 EXP 410 LCP, both available from ROLIC Technologies Ltd. (Allschwil, Switzerland).

Figure 11A:
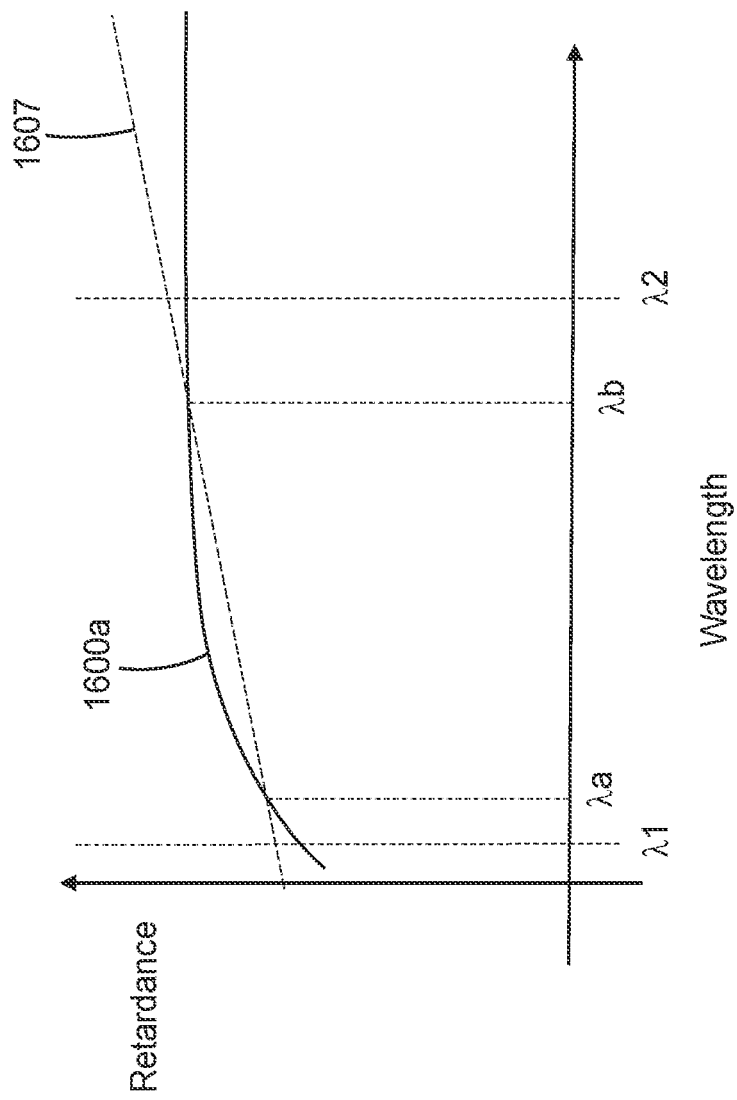
FIGS. 11A-11B are schematic plots of retardance versus wavelength.
Figure 11B:
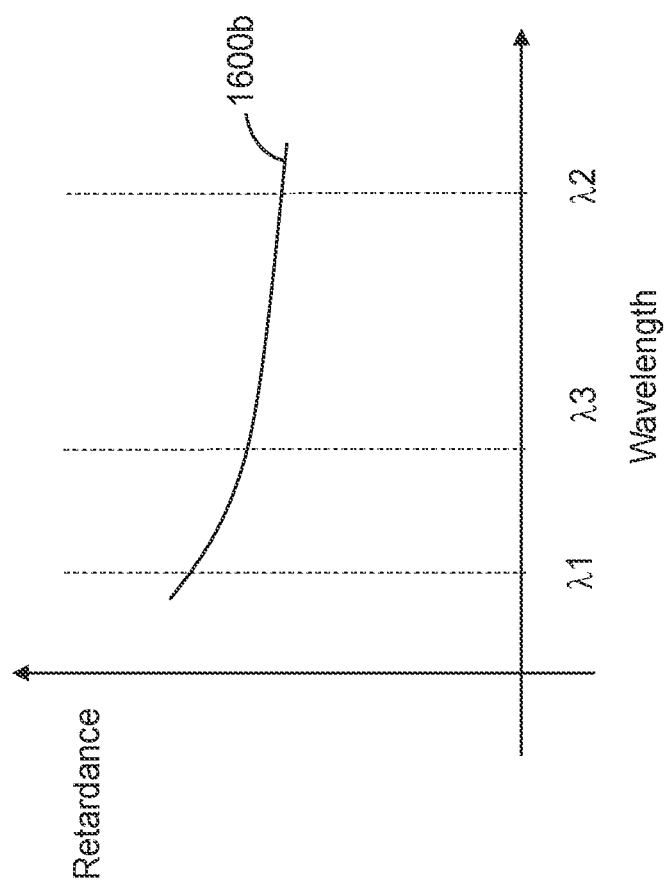
Figure 12:
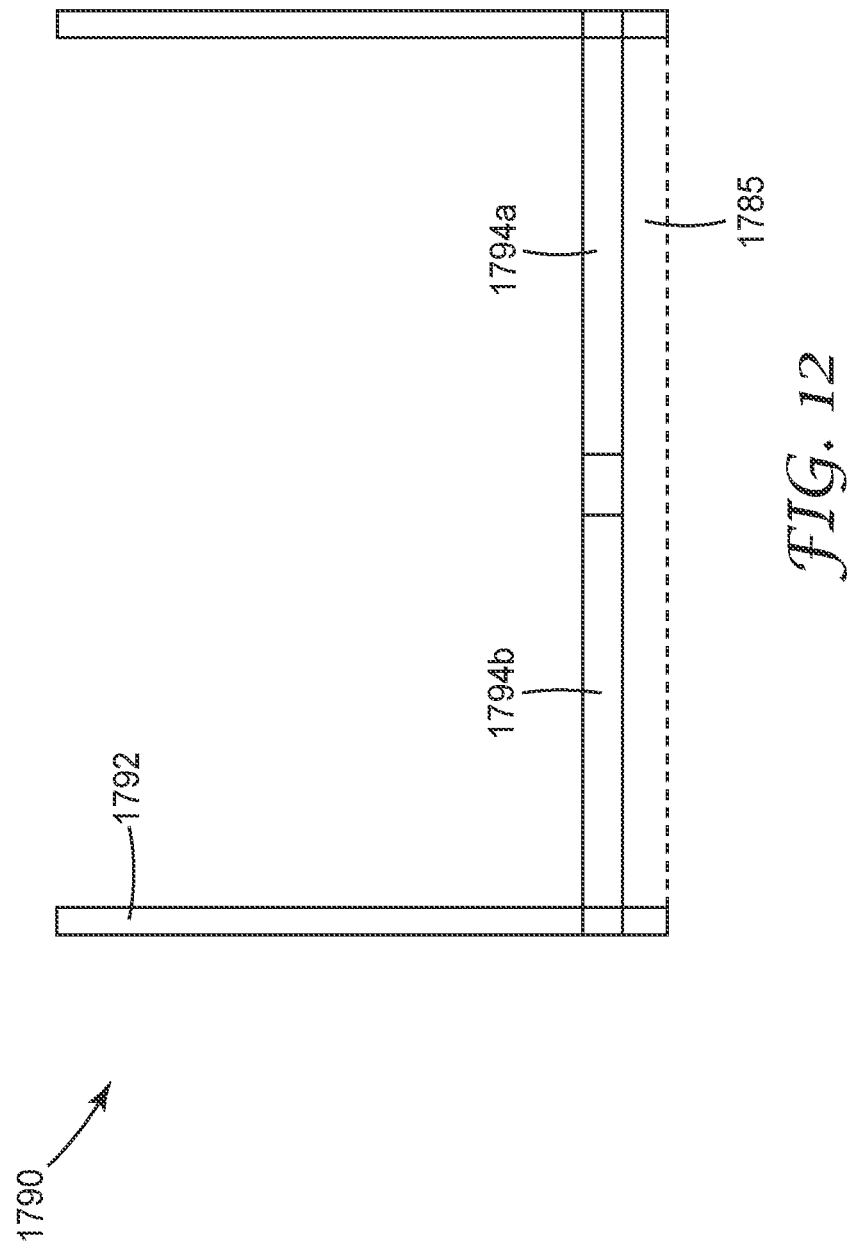
FIG. 12 is a schematic top view of a headset.

FIG. 11A is a schematic illustration of retardance (e.g., in nm) versus wavelength for a retarder. The retardance versus wavelength is a wavelength dispersion curve 1600a. The dispersion curve 1600a is similar to the dispersion curve of an achromatic retarder available from Merck (Darmstadt, Germany), for example. The dispersion curve 1607 of an ideal achromatic quarter-wave retarder is also shown. The retarder having the dispersion curve 1600a may be a quarter-wave retarder at the wavelength λa and at λb, for example, and may be substantially quarter-wave (e.g., a retardance within 5% of quarter wave) over a wavelength range in the predetermined wavelength range (e.g., from λ1 to λ2). FIG. 11B is a schematic illustration of a wavelength dispersion curve 1600b for a different retarder layer. The dispersion curve 1600b is similar to a dispersion curve of a conventional retarder such as that of an oriented polymer layer. The dispersion curve 1600b changes monotonically with increasing wavelength in the predetermined wavelength range. The retarder layer having the dispersion curve 1600b may be a substantially quarter-wave retarder at the wavelength λ3, for example.

Any of the optical systems or display systems of the present description may be used in a device such as a headset (e.g., a headset for a head-mounted display or a virtual or augmented reality display). The headset may include one or more display panels which may be removable (e.g., the headset may be adapted to receive a phone which has a display panel). FIG. 19 is a schematic top view of headset 1790 including a frame 1792, and left and right display portions 1794a and 1794b which may include respective left and right optical systems where each of the left and right optical systems is an optical system according to the present description. An optional removable display panel 1785 is illustrated. In other embodiments, left and right display panels or left and right portions of a display panel are included in the left and right display portions 1794a and 1794b.

If the use of "about" as applied to quantities expressing feature sizes, amounts, and physical properties is not otherwise clear to one of ordinary skill in the art in the context in which it is used and described in the present description, "about" will be understood to mean within 10 percent of the specified quantity, but also includes exactly the specified quantity. For example, if it is not otherwise clear to one of ordinary skill in the art in the context in which it is used and described in the present description, a quantity having a value of about 1, means that the quantity has a value between 0.9 and 1.1, but also includes a value of exactly 1.

EXAMPLES

Example 1

A reflective polarizer was made as follows. A single multilayer optical packet was co-extruded. The packet included 275 alternating layers of 90/10 coPEN and low index isotropic layers. 90/10 coPEN is a polymer composed of 90% polyethylene naphthalate (PEN) and 10% polyethylene terephthalate (PET). The isotropic layers were made with a blend of polycarbonate and copolyesters (PC:coPET) as described in WO2015035030 such that the index was about 1.57 and the layers remained substantially isotropic upon uniaxial orientation. The PC:coPET molar ratio was approximately 42.5 mol % PC and 57.5 mol % coPET. The isotropic layers had a Tg of 105 degrees centigrade. This isotropic material was chosen such that after stretching its refractive indices in the two non-stretch directions remained substantially matched with those of the birefringent material in the non-stretching direction while in the stretching direction there was a substantial mismatch in refractive indices between birefringent and non-birefringent layers. The 90/10 PEN and PC:coPET polymers were fed from separate extruders ratios of total flow of 44% and 56% for 90/10 coPEN and PC:coPET respectively to a multilayer coextrusion feedblock. The materials were assembled into a packet of 275 alternating optical layers, plus a thicker protective boundary layer of the on each side of 90/10 PEN on one side and PC:coPET on the other, for a total of 277 layers. The multilayer melt was then cast through a film die onto a chill roll, in the conventional manner for polyester films, upon which it was quenched. The cast web was then stretched in a parabolic tenter similar to that described in the Invited Paper 45.1, authored by Denker et al., entitled "Advanced Polarizer Film for Improved Performance of Liquid Crystal Displays," presented at Society for Information Displays (SID) International Conference in San Francisco, Calif., Jun. 4-9, 2006. The transverse direction draw ratio (TDDR) in the parabolic tenter was about 6.0 and the machine direction draw ratio (MDDR) was about 0.43.

Figure 13:
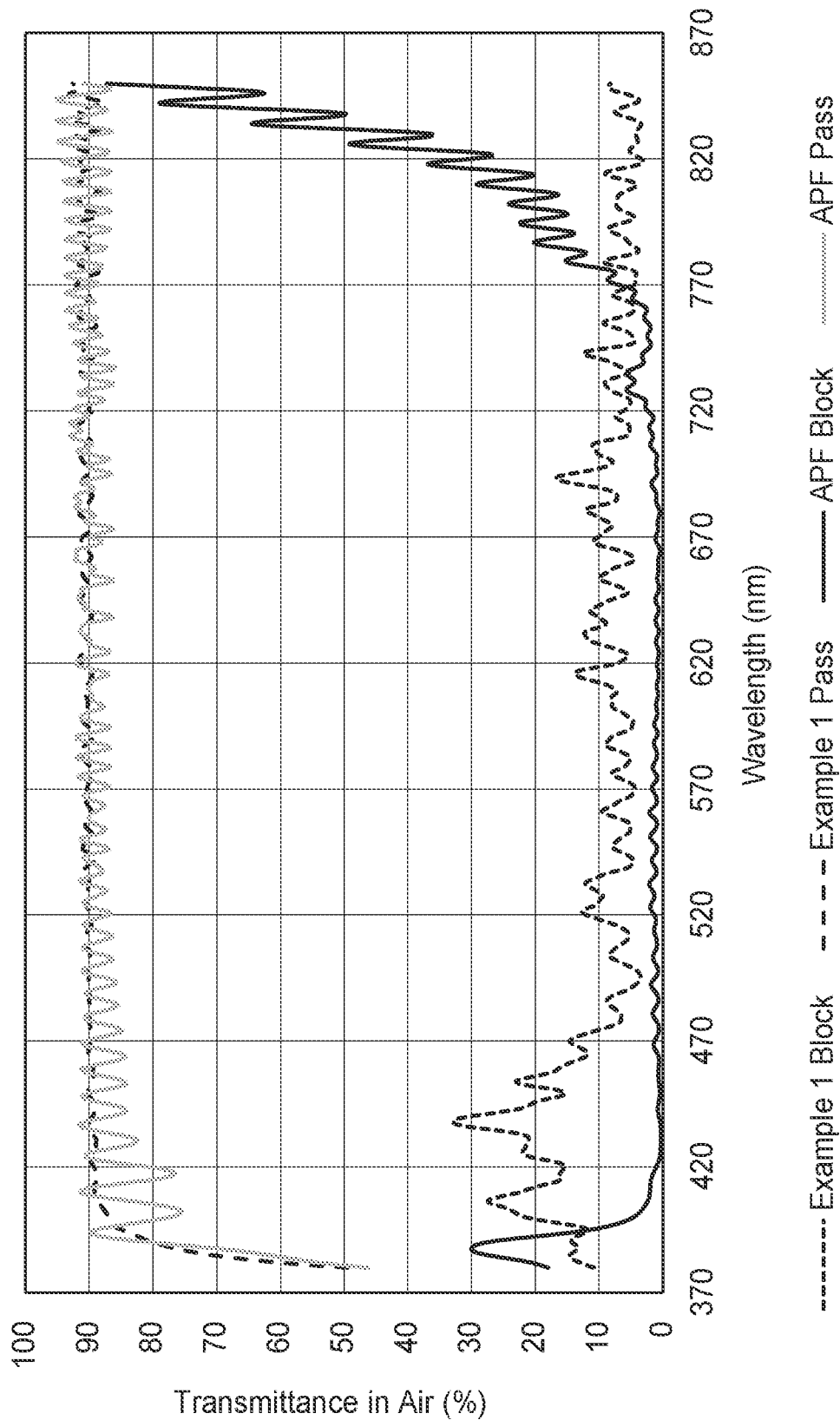
FIG. 13 is a plot of transmittance through reflective polarizers versus wavelength for the block and pass states.
Figure 14:
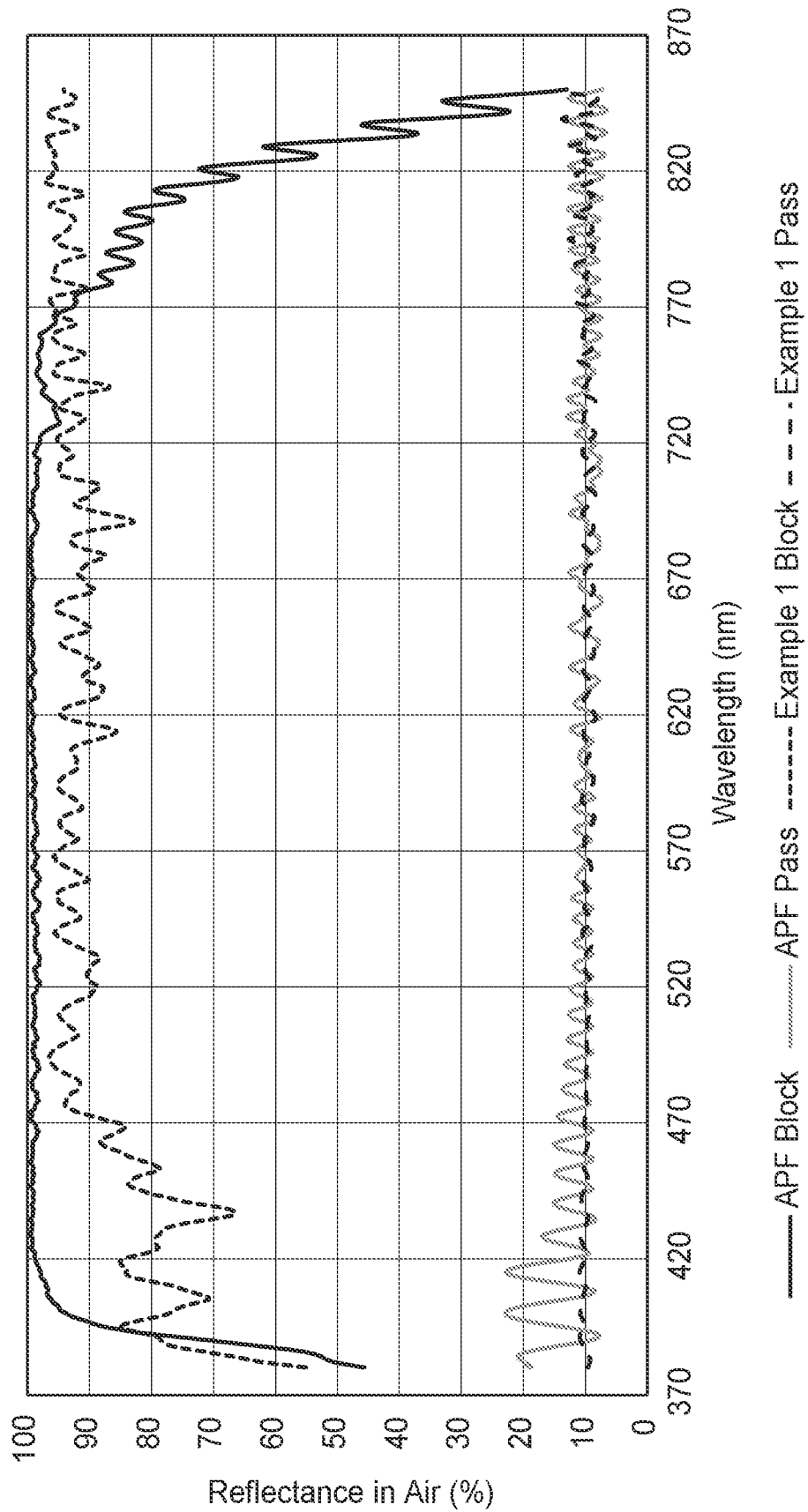
FIG. 14 is a plot of reflectance from reflective polarizers versus wavelength for the block and pass states.

The reflectance and transmittance in air (external reflectance and transmittance) at normal incidence was measured using a LAMBDA 1050 UV/Vis Spectophotometer with polarizer option available from PerkinElmer (Waltham, MA). The CIE Illuminant C was used for the light source. The resulting transmittance and reflectance in air for the reflective polarizer of Example 1 and for a sample of Advanced Polarizing Film (APF) available from 3M Company (St. Paul, MN) are shown in FIGS. 13-14. Next, the refractive indices of an outermost layer of the reflective polarizer was measured with a Metricon 2010/M prism coupler at wavelengths of 404 nm, 532 nm, and 633 nm. The table below lists the measured refractive indices of the outermost layers (each outermost layer of the reflective polarizer used a same polymer material and so the refractive indices were assumed to the be same in each outermost layer) in the machine direction (MD) corresponding to the pass axis, the transverse direction (TD) corresponding to the block axis, and the thickness (Z) direction for the reflective polarizer of Example 1 and for a sample of APF.

|  | 633 nm | | | 532 nm | | | 404 nm | | |
| --- | --- | --- | --- | --- | --- | --- | --- | --- | --- |
|  | MD | TD | Z | MD | TD | Z | MD | TD | Z |
| APF | 1.5745 | 1.5676 | 1.5688 | 1.5797 | 1.5799 | 1.5786 | 1.6093 | 1.6111 | 1.6111 |
| Example 1 | 1.5708 | 1.5733 | 1.5727 | 1.5809 | 1.5838 | 1.5804 | 1.6100 | 1.6137 | 1.6096 |

From the measured refractive indices, the photopically averaged reflectance of each of the surfaces was determined to be about 5.03 percent using Macleod optical modeling software available from Thin Film Center Inc (Tucson, AZ). The internal reflectance and internal transmittance was then determined by simultaneously solving the equations describing the external reflectance and transmittance in terms of the internal reflectance and transmittance and in terms of repeated Fresnel reflections from the front and rear surfaces. The series of repeated reflections included up to 5 reflections from the reflective polarizer. The photopically averaged results for the reflective polarizer of Example 1 were $R_s^{ph}=92.4\%$, $R_p^{ph}=0.15\%$, $T_s^{ph}=7.8\%$, and $T_p^{ph}=99.7\%$. All photopic averaging was carried out based on the CIE 1931 2° Standard Observer. In comparison, the results of the measurement method applied to a sample of APF were Rs Ph=98.8%, $R_p^{ph}=1.2\%$, $T_s^{ph}=1.2\%$, and $T_p^{ph}=98.4\%$.

An optical system similar to optical system 600 was constructed where a sample of the reflective polarizer of Example 1 was used as the reflective polarizer 630. The optical system utilized a checkerboard pattern on glass available from Precision Optical Imaging (Rush, NY) in place of the display panel 604. Each of the optically clear adhesive layers used in the optical system was a layer of Optically Clear Adhesive 8172 available from 3M Company (St. Paul, MN). The retarders 685, 625, and 663 were each a Teijin FM143 quarter-wave retarder available from Teijin Co. (Japan). For the retarders 685 and 625, an index matching layer consisting essentially of a $SiO_2$ layer disposed directly on the retarder and an $Al_2O_3$ layer disposed on the $SiO_2$ layer was included on each major surface of the retarder. The antireflection layer 629 was replaced with a similar index matching layer and the absorptive polarizer 661 was laminated to this index matching layer and the retarder 663 was laminated to the absorptive polarizer 661 through another optically clear adhesive layer. An index matching layer as described above was disposed on the retarder 663 adjacent this optically clear adhesive layer. An antireflection coating was disposed on the retarder 663 facing the exit surface 652. This antireflection coating and the antireflection coating 649 consisted essentially of alternating layers of $TiO_2$ and $MgF_2$ for a total of 6 layers. The absorptive polarizer 691 was an AP38 polarizer available from API American Polarizers, Inc. (Reading, PA). The absorptive polarizer 661 was an AP Sanritz HLC2-5618 available from Sanritz Co. (Japan). The partial reflector 620 was a half-silvered mirror. The lens 610 was a plano-convex glass lens available from Edmund Optics (Barrington, NJ).

A 14×14 array of squares arranged in checkerboard pattern of bright and dark squares within about a 19 mm aperture was displayed by using a white light emitting diode (LED) light source to provide light to the glass having the checkerboard pattern. An image was formed from the displayed pattern and a square region of 4 squares by 4 squares (4 squares across included 2 bright and 2 dark squares) near the center of the image was analyzed. The intensity in the bright and dark squares was measured with a color camera which recorded a number of counts in each of a red, green, and blue color channel that was proportional to the intensity. A lens and diffuser was placed between the LED and the glass having the checkerboard pattern to provide a full cone angle of about 30 degrees. Masks were defined to exclude transition regions from the bright and dark regions (squares). This defined a central region of each bright and dark region. The area of the central regions was varied and found to have minimal effect on the resulting Ib/Id ratio when the area of the central regions was in a range of about 30% to about 70% of the area of the corresponding bright or dark region. Camera exposures of 8 ms, 12 ms, 16 ms, and 24 ms were used and measurements were repeated with the camera lens cap in place to dark subtract in order to provide the correct baseline. The results of the different exposures were integrated to form a high dynamic range image. The average (mean) brightness Ib in the central regions of the bright regions was determined and the average (mean) brightness Id in the central regions of the dark regions was determined for each of the red, green, and blue color channels. Another optical system was prepared that was equivalent to the tested optical system except that the reflective polarizer was replaced with APF. The ratios Ib/Id was determined for this optical system as described above. The results are provided in the following table.

| Color Channel | Ib/Id | |
|---|---|---|
| | Example 1 | Optical System with APF |
| Red | 66.7 | 51.7 |
| Green | 82.6 | 69.0 |
| Blue | 76.6 | 60.0 |

Example 2

A reflective polarizer similar to the reflective polarizer of Example 1 was modeled. The 4×4 matrix method using the Berreman algorithm was used to determine the spectra of constructive and destructive interference generated from layer interfaces in the reflective polarizer. The reflective polarizer was modeled as having 275 alternating birefringent and isotropic layers where the thickness and the refractive indices of the birefringent and isotropic layers were modeled based on properties of the birefringent and isotropic layers of the reflective polarizer of Example 1. The refractive indices of the isotropic layer in each direction were taken to be 1.5792 at a wavelength of 550 nm and 1.5705 at a wavelength of 633 nm, and smoothly varying between and above 633 nm wavelength, and blow 500 nm wavelength. The refractive index of the birefringent layers in the block direction was taken to be 1.8372 at 550 nm and 1.8120 and 633 nm, similarly varying across the visible spectrum. The refractive index of the birefringent layers in the pass direction was taken to be 1.5755 at 550 nm and 1.5652 and 633 nm. The refractive index of the birefringent layers in the thickness direction was taken to be 1.5690 at 550 nm and 1.5587 and 633 nm. Both were taken as smoothly varying across the visible spectrum, as above. Optical stack thickness for the reflective polarizer was obtained by an Atomic Force Microscopy measurement. The internal reflectance for the pass and block states for light normally incident on the reflective polarizer optical stack was calculated, by embedding the entire stack in ½ spaces of material whose refractive indices matched those of the exterior layers on the reflective polarizer stack. The results averaged over wavelengths from 450 nm to 650 nm were Rs=89.0% and Rp=0.198%.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising a plurality of interference layers reflecting and transmitting light primarily by optical interference, such that for a substantially normally incident light in a predetermined wavelength range extending at least from about 450 nm to about 600 nm, the plurality of interference layers has an average optical reflectance Rs for a first polarization state, and an average optical transmittance Tp and an average optical reflectance Rp for a second polarization state orthogonal to the first polarization state, Tp≥80%, Rp≤1%, and 80%≤Rs≤95%.

2. The optical film of claim 1, wherein the plurality of interference layers number between 200 and 500 in total, each interference layer having an average thickness less than about 500 nm.

3. The optical film of claim 1, wherein the plurality of interference layers comprises a plurality of alternating first and second polymeric layers, such that for the substantially normally incident light in the predetermined wavelength range, a maximum index of refraction of the second polymeric layer is greater than a maximum index of refraction of the first polymeric layer, and a difference between the maximum index of refraction of the second polymeric layer and a minimum index of refraction of the first polymeric layer is less than about 0.3.

4. The optical film of claim 1, wherein the plurality of interference layers comprises a plurality of alternating first and second polymeric layers, wherein for each pair of adjacent first and second polymeric layers:
   the first polymeric layer has an index n1x along the first polarization state, an index of refraction n1y along the second polarization state, and an index n1z along a z-axis orthogonal to the first and second polarization states; and
   the second polymeric layer has an index n2x along the first polarization state, an index of refraction n2y along the second polarization state, and an index n2z along the z-axis, such that for at least one wavelength in the predetermined wavelength range:
   a maximum difference between n1x, n1y and n1z is less than about 0.002; and
   a difference between n2x and n1x is greater than about 0.2.

5. The optical film of claim 4, wherein for the at least one wavelength in the predetermined wavelength range, a difference between n2y and n2z is greater than about 0.002 and less than about 0.008.

6. The optical film of claim 4, wherein for the at least one wavelength in the predetermined wavelength range, a difference between n2x and n1x is in a range of about 0.22 to about 0.28.

7. The optical film of claim 1, wherein for the substantially normally incident light in the predetermined wavelength range and for the first polarization state, the plurality of interference layers has an average optical transmittance Ts of less than about 10%.

8. The optical film of claim 1, wherein $Rp \leq 0.6\%$.

9. The optical film of claim 1, wherein $Rp \leq 0.25\%$.

10. An optical system comprising the optical film of claim 1, wherein the optical system is configured such that for a light ray incident on the optical system, the optical film transmits the light ray after first reflecting the light ray.

11. The optical system of claim 10 being configured to display an image to a viewer positioned proximate an exit surface of the optical system, wherein for an incident cone of light having a full cone angle of at least 10 degrees that is incident on the optical system from an object comprising a spatial frequency of less than about 1 line pair per millimeter, and that exits the optical system through the exit surface as an exiting cone of light, when the exiting cone of light is imaged proximate the exit surface, the image has a plurality of alternating bright and dark regions, Ib being an average brightness of a central 90% of the bright regions, Id being an average brightness of a central 90% of the dark regions, $Ib/Id \geq 50$.

12. A headset comprising left and right optical systems, each of the left and right optical systems being an optical system according to claim 10.

* * * * *